(12) United States Patent
Ito

(10) Patent No.: US 10,866,913 B2
(45) Date of Patent: Dec. 15, 2020

(54) COMMUNICATION DEVICE AND CONTROL METHOD

(71) Applicant: SONY SEMICONDUCTOR SOLUTIONS CORPORATION, Kanagawa (JP)

(72) Inventor: Katsuhisa Ito, Kanagawa (JP)

(73) Assignee: Sony Semiconductors Solutions Corporation, Kanagawa (JP)

( * ) Notice: Subject to any disclaimer, the term of this patent is extended or adjusted under 35 U.S.C. 154(b) by 0 days.

(21) Appl. No.: 15/578,773

(22) PCT Filed: May 26, 2016

(86) PCT No.: PCT/JP2016/065581
§ 371 (c)(1),
(2) Date: Dec. 1, 2017

(87) PCT Pub. No.: WO2016/199584
PCT Pub. Date: Dec. 15, 2016

(65) Prior Publication Data
US 2018/0217955 A1 Aug. 2, 2018

(30) Foreign Application Priority Data
Jun. 9, 2015 (JP) .................................. 2015-116649

(51) Int. Cl.
*G06F 13/38* (2006.01)
*G06F 13/42* (2006.01)
(Continued)

(52) U.S. Cl.
CPC ............ *G06F 13/382* (2013.01); *G06F 13/20* (2013.01); *G06F 13/4068* (2013.01);
(Continued)

(58) Field of Classification Search
CPC .......................... G06F 13/385; G06F 13/4282
See application file for complete search history.

(56) References Cited

U.S. PATENT DOCUMENTS

| 6,912,651 | B1 * | 6/2005 | Hamdi | G06F 13/385 |
| | | | | 345/163 |
| 7,617,342 | B2 * | 11/2009 | Rofougaran | H01Q 1/2275 |
| | | | | 235/492 |

(Continued)

FOREIGN PATENT DOCUMENTS

| JP | 2007-074641 | 3/2007 |
| JP | 2013-247520 | 12/2013 |

(Continued)

OTHER PUBLICATIONS

Claims of U.S. Appl. No. 15/580,511, filed Apr. 2, 2019 (Year: 2019).*

(Continued)

*Primary Examiner* — Brian T Misiura
(74) *Attorney, Agent, or Firm* — Sheridan Ross P.C.

(57) ABSTRACT

The present technology relates to a communication device and a control method that allow variation of modes of connection between electronic devices to be increased. A transmission unit transmits a modulated signal obtained by frequency-converting a baseband signal into a signal of a frequency band higher than the baseband signal by using a predetermined carrier. A detecting unit detects a termination unit of a second electronic device having the termination unit to be detected by a first electronic device as a communication partner. A controller causes the transmission unit to transmit carriers in response to the detection of the termination unit. The present technology is applied to, for example, communication between optional electronic (Continued)

devices such as communication between a universal serial bus (USB) host and a USB device.

4 Claims, 14 Drawing Sheets

(51) Int. Cl.
    *G06F 13/40*       (2006.01)
    *H04L 27/14*       (2006.01)
    *G06F 13/20*       (2006.01)
    *H04L 27/12*       (2006.01)
    *H04L 27/02*       (2006.01)

(52) U.S. Cl.
    CPC .......... *G06F 13/4086* (2013.01); *G06F 13/42* (2013.01); *H04L 27/12* (2013.01); *H04L 27/14* (2013.01); *H04L 27/02* (2013.01)

(56) References Cited

U.S. PATENT DOCUMENTS

| | | | | |
|---|---|---|---|---|
| 8,498,583 B2* | 7/2013 | Ito | ............................ | H04B 1/40 |
| | | | | 455/323 |
| 8,856,633 B2* | 10/2014 | Lakkis | .................. | H04L 1/1829 |
| | | | | 710/106 |
| 9,178,504 B2* | 11/2015 | Komori | .................... | H03K 7/02 |
| 9,378,110 B2* | 6/2016 | Miyaoka | .............. | G06F 11/3041 |
| 9,558,144 B2* | 1/2017 | Nge | ....................... | G06F 13/382 |
| 9,588,859 B2* | 3/2017 | Wu | ........................ | G06F 11/221 |
| 9,832,279 B2* | 11/2017 | Nishioka | ............ | H04N 21/6371 |
| 2003/0070103 A1* | 4/2003 | Kim | .......................... | G06F 1/26 |
| | | | | 713/300 |
| 2013/0109317 A1* | 5/2013 | Kikuchi | ................... | H04B 7/24 |
| | | | | 455/41.2 |
| 2013/0266026 A1* | 10/2013 | McCormack | ........... | G06F 13/00 |
| | | | | 370/474 |
| 2015/0278063 A1* | 10/2015 | Miyaoka | ............. | G06F 11/3041 |
| | | | | 375/257 |
| 2016/0239075 A1* | 8/2016 | Miyaoka | ................... | G06F 1/26 |
| 2018/0143931 A1* | 5/2018 | Miyaoka | ................. | G06F 13/38 |

FOREIGN PATENT DOCUMENTS

JP          2014-182705         9/2014
WO    WO 2015/056581      4/2015

OTHER PUBLICATIONS

International Search Report prepared by the Japan Patent Office dated Jul. 29, 2016, for International Application No. PCT/JP2016/065581.

* cited by examiner

COMMUNICATION DEVICE AND CONTROL METHOD

CROSS REFERENCE TO RELATED APPLICATIONS

This application is a national stage application under 35 U.S.C. 371 and claims the benefit of PCT Application No. PCT/JP2016/065581 having an international filing date of 26 May 2016, which designated the United States, which PCT application claimed the benefit of Japanese Patent Application No. 2015-116649 filed 9 Jun. 2015, the disclosures of which are incorporated herein by reference in their entirety.

TECHNICAL FIELD

The present technology relates to a communication device and a control method, and more particularly, to a communication device and a control method capable of increasing variation of modes of connection between electronic devices such as a universal serial bus (USB) host and a USB device.

BACKGROUND ART

For example, in electronic devices capable of performing USB communication, one electronic device serves as a USB host, and the other electronic device serves as a USB device, and USB communication is performed.

The USB host and the USB device are connected to each other by using, for example, a USB cable, and the USB host takes initiative to control the communication between the USB host and the USB device.

The USB communication is compatible with bus power, and it is possible to supply power from the USB host to the USB device via the USB cable.

However, according to the USB standard, the upper limit of a current that can be supplied as a power is specified by one USB cable. Therefore, a technology for supplying power from a USB host to a USB device of which consumption current exceeds the upper limit specified in the USB standard has been proposed (for example, refer to Patent Document 1).

CITATION LIST

Patent Document

Patent Document 1: Japanese Patent Application Laid-Open No. 2012-008716

SUMMARY OF THE INVENTION

Problems to be Solved by the Invention

Meanwhile, there has been a request to increase variation of modes of connection between electronic devices.

The present technology has been made in consideration of such a situation, and a purpose of the present technology is to increase variation of modes of connection between electronic devices.

Solutions to Problems

A communication device according to the present technology includes a transmission unit which transmits a modulated signal obtained by frequency-converting a baseband signal into a signal having a higher frequency band than the baseband signal by using a predetermined carrier, a detecting unit which detects a termination unit of a second electronic device having the termination unit detected by a first electronic device to be a communication partner, and a controller which makes the transmission unit transmit the carrier in response to the detection of the termination unit.

A control method according to the present technology includes detecting a termination unit of a second electronic device by a detecting unit of a communication device; and making a transmission unit transmit a carrier in response to the detection of the termination unit by a controller. The communication device includes the transmission unit which transmits a modulated signal obtained by frequency-converting a baseband signal into a signal having a higher frequency band than the baseband signal by using a predetermined carrier, the detecting unit which detects the termination unit of the second electronic device having the termination unit detected by a first electronic device to be a communication partner, and the controller which makes the transmission unit transmit the carrier.

In the communication device and the control method according to the present technology, a termination unit of a second electronic device having the termination unit to be detected by a first electronic device to be a communication partner is detected, and a transmission unit, which transmits a modulated signal obtained by frequency-converting a baseband signal into a signal in a frequency band higher than a baseband signal by using a predetermined carrier in response to the detection of the termination unit, transmits the carrier.

Furthermore, the communication device may be an independent device and may be an inner block forming a single device.

Effects of the Invention

According to the present technology, it is possible to increase variation of modes of connection between electronic devices.

Note that the effects described herein are not limited and that the effect may be any effects described in the present disclosure.

MODE FOR CARRYING OUT THE INVENTION

<Exemplary Configuration of Communication System in which Electronic Devices are Connected with Cable>

Figure 1:
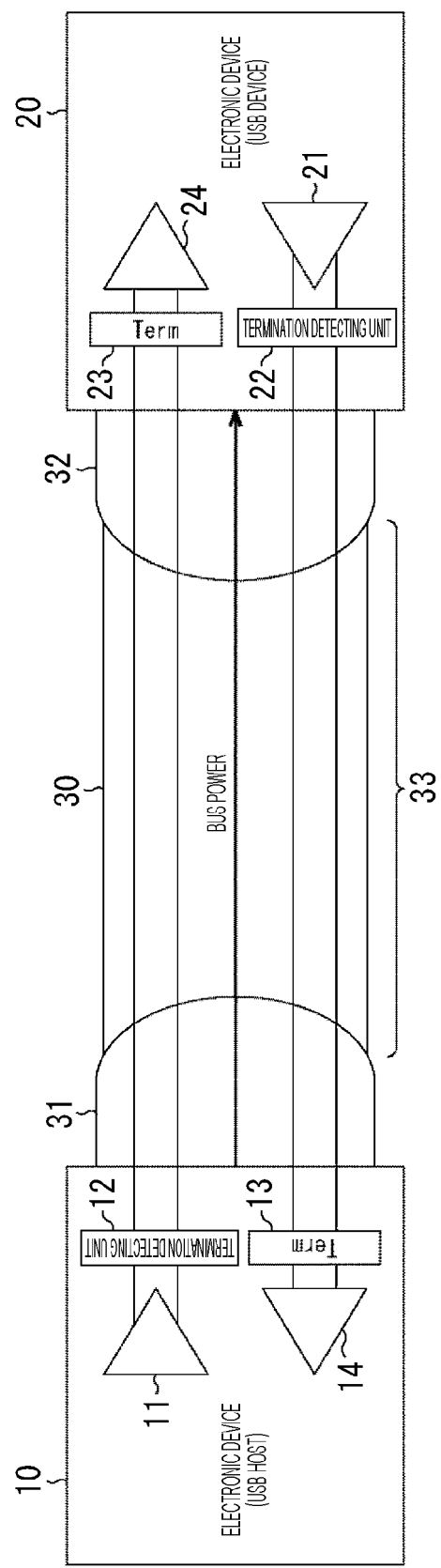
FIG. 1 is a diagram of an exemplary configuration of a communication system in which electronic devices are connected to each other with an electronic cable.

FIG. 1 is a diagram of an exemplary configuration of a communication system in which electronic devices are connected to each other with an electronic cable.

In the communication system in FIG. 1, electronic devices 10 and 20 are connected to each other with a cable 30. Note that the cable 30 can be configured to be detachable from the electronic devices 10 and 20.

The electronic device 10 includes an output interface (I/F) 11, a termination detecting unit 12, a termination unit (Term) 13, and an input I/F 14, and the electronic device 10 can exchange (input/output) a baseband signal of the baseband with an electronic device to be a communication partner such as the electronic device 20 (referred to as "partner device" below).

The output I/F 11 functions as an I/F for outputting the baseband signal to be transmitted to the partner device. The baseband signal output from the output I/F 11 is transmitted to the electronic device 20, which is a partner device of the electronic device 10, via the termination detecting unit 12 and the cable 30.

The termination detecting unit 12 detects a termination unit 23 included in the electronic device 20 which is the partner device of the electronic device 10.

Here, with the detection of the termination unit 23 of the electronic device 20 by the termination detecting unit 12, it is assumed that the electronic device 10 be connected to the electronic device 20 which is the partner device of the electronic device 10, and the output I/F 11 starts to output the baseband signal to be transmitted to the electronic device 20 which is the partner device.

The termination unit 13 is an example of a mechanism to be detected by the electronic device 20 which is the partner device of the electronic device 10, and includes a termination resistor or the like. When the electronic device 10 is activated and the activation is completed, the termination unit 13 is turned on from an OFF state, and the termination unit 13 can be detected from outside.

Note that, as the mechanism to be detected, an optional mechanism that is detected by the partner device when the electronic device 10 and the partner device are connected can be employed, in addition to the termination resistor and the like. For example, as the mechanism to be detected, a circuit for outputting a predetermined signal which has been determined in advance or the like can be employed.

The input I/F 11 functions as an I/F for receiving the baseband signal transmitted from the electronic device 20, which is the partner device of the electronic device 10, via the cable 30 and the termination unit 13.

The electronic device 20 includes an output I/F 21, a termination detecting unit 22, the termination unit 23, and an input I/F 24, and the electronic device 20 can exchange the baseband signal of the baseband with the partner device such as the electronic device 10.

The output I/F 21 to the input I/F 24 are configured similarly to the output I/F 11 to the input I/F 14, respectively.

The cable 30 has connectors 31 and 32 and a cable part 33.

The connector 31 is provided at one end of the cable part 33 and is detachable from the electronic device 10. The connector 32 is provided at the other end of the cable part 33 and is detachable from the electronic device 20. The cable part 33 is formed of a conductor through which an electric signal as a baseband signal is transmitted.

In the communication system configured as described above, when the electronic devices 10 and 20 are connected to each other by using the cable 30, that is, when the connector 31 is attached to the electronic device 10 and the connector 32 is attached to the electronic device 20, the termination detecting unit 12 detects the termination unit 23 as the mechanism to be detected of the electronic device 20 via the cable 30 in the electronic device 10, and the connection with the electronic device 20 is recognized according to the detection of the termination unit 23.

In the electronic device 10, when the connection with the electronic device 20 is recognized, the output I/F 11 starts to output a baseband signal to be transmitted to the electronic device 20, and the baseband signal is received by the input I/F 24 via the termination detecting unit 12, the cable 30, and the termination unit 23.

On the other hand, in the electronic device 20, the termination detecting unit 22 detects the termination unit 13 as a mechanism to be detected of the electronic device 10 via the cable 30, and the connection with the electronic device 10 is recognized according to the detection of the termination unit 13.

In the electronic device 20, when the connection with the electronic device 10 is recognized, the output I/F 21 starts to output a baseband signal to be transmitted to the electronic device 10, and the baseband signal is received by the input I/F 14 via the termination detecting unit 22, the cable 30, and the termination unit 13.

As described above, the communication method for detecting (recognizing) the connection between the electronic devices according to the detection of the mechanism to be detected and starting the communication is employed, for example, in a USB (USB 3.0) standard and the like.

In the following description, the present technology will be described assuming that the electronic device 10 and the electronic device 20 are, for example, electronic devices capable of performing USB communication.

In a case where the electronic device 10 and the electronic device 20 can perform the USB communication, one of the electronic devices 10 and 20 becomes a USB host, and the other becomes a USB device. Then, both electronic devices perform the USB communication.

In the following description, it is assumed that the electronic device 10 becomes the USB host and the electronic device 20 becomes the USB device. The electronic device 10 is also referred to as a USB host 10, and the electronic device 20 is also referred to as a USB device 20.

Furthermore, the cable 30 may be referred to as a USB cable 30.

An electronic device to be the USB host 10 operates by independently receiving power supply from an external power source (without bus power) or by receiving power supply from a built-in battery. The electronic device is a device having at least a function to be the USB host, such as a personal computer (PC) and a digital camera.

The electronic device to be the USB device 20 operates by receiving power supply from the bus power such as disk drive or power supply from the external power supply or built-in battery. The electronic device has at least a function to be the USB device.

Figure 2:
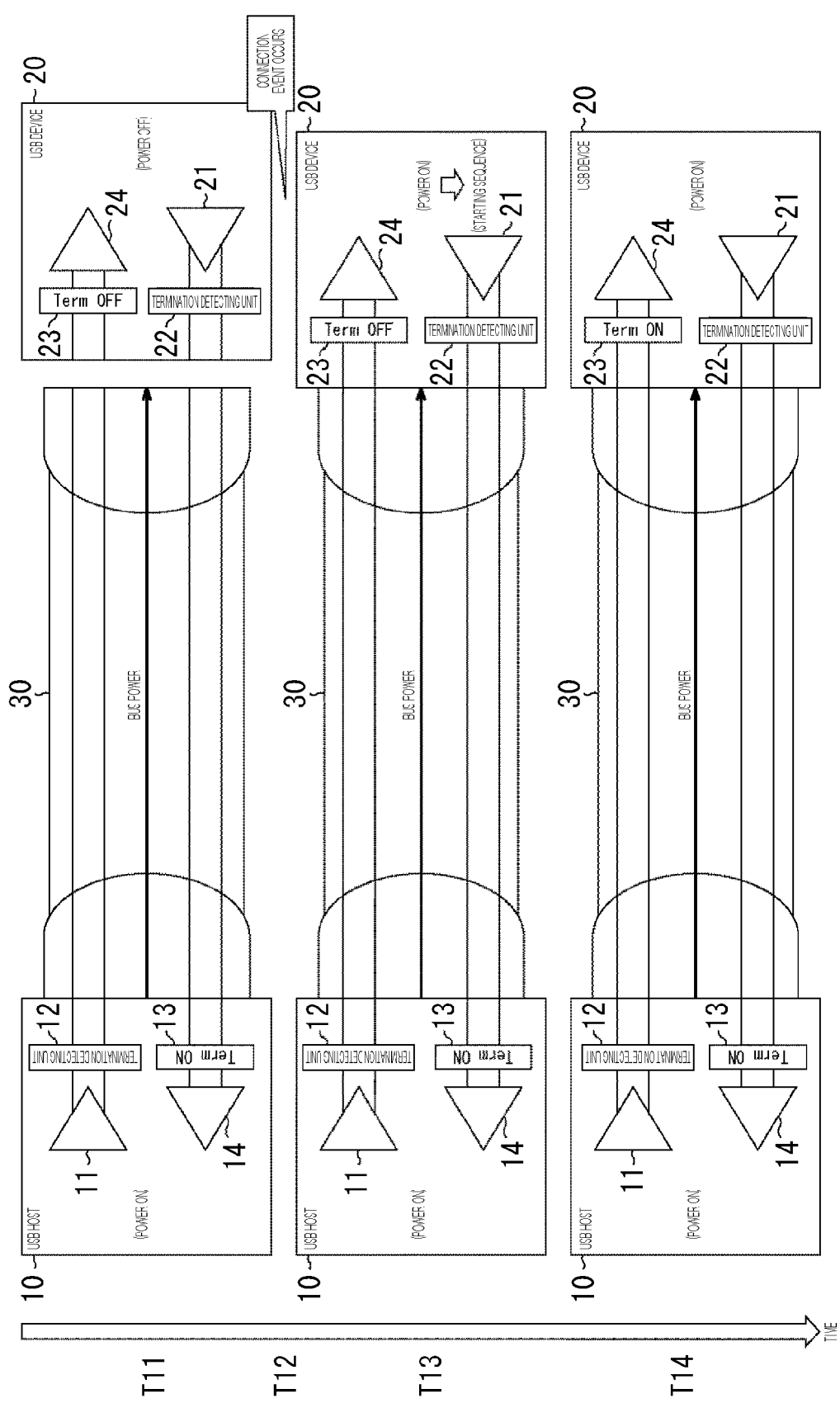
FIG. 2 is a diagram of an exemplary operation of the communication system.

FIG. 2 is a diagram to describe an exemplary operation of the communication system in FIG. 1 in which the USB host 10 and the USB device 20 are connected to each other with a USB cable 30.

At a time T11, the USB host 10 operates by receiving power supply from the external power supply or the built-in battery.

At the time T11, the USB host 10 is in a state of functioning as a USB host, and the termination unit 13 of the USB host 10 is in the ON state (Term ON).

Note that, in FIG. 2, the USB device 20 operates by receiving power supply by bus power. At the time T11, the USB host 10 and the USB device 20 are not yet connected to each other with the USB cable 30. Therefore, the power is not supplied to the USB device 20 by the bus power, and the USB device 20 is turned off.

Therefore, at the time T11, the USB device 20 is not yet in a state of functioning as a USB device, and the termination unit 23 of the USB device 20 is turned off (Term OFF).

After the time T11, when a connection event occurs at a time T12, power supply by the bus power from the USB host 10 to the USB device 20 is started, and the USB device 20 is turned on.

Here, the connection event is an event to be a trigger to start data transmission between the USB device 20 and the USB host 10, and in FIG. 2, for example, connection between the USB host 10 and the USB device 20 with the USB cable 30 can be employed as the connection event.

The USB device 20 starts a starting sequence to be in a state where the USB device 20 functions as a USB device at a time T13 after the power is turned on.

In the USB device 20, during the starting sequence, the termination unit 23 is not yet in the ON state and remains in the OFF state.

At a time T14, when the starting sequence of the USB device 20 has been completed (terminated) and the USB device 20 has been in the state of functioning as a USB device, the state of the termination unit 23 changes from the OFF state to the ON state (Term ON).

Then, in the USB host 10, the termination detecting unit 12 detects the termination unit 23 of the USB device 20 which has been turned on. In addition, in the USB device 20 that has completed the starting sequence, the termination detecting unit 22 detects the termination unit 13 of the USB host 10 in the ON state.

In the USB host 10, the output I/F 11 starts to output the baseband signal to be transmitted to the electronic device 20 in response to the detection of the termination unit 23 of the USB device 20.

The baseband signal output from the output I/F 11 is received by the input I/F 24 of the USB device 20 via the termination detecting unit 12, the cable 30, and the termination unit 23.

In the USB device 20 in which the termination unit 13 of the USB host 10 in the ON state has been detected by the termination detecting unit 22, the output I/F 21 outputs the baseband signal as a response corresponding to the baseband signal from the USB host 10.

The baseband signal as the response output from the output I/F 21 is received by the input I/F 14 of the USB host 10 via the termination detecting unit 22, the cable 30, and the termination unit 13.

<Exemplary Configuration of Communication System Performing Data Transmission by Modulated Signal Obtained by Frequency Conversion>

Figure 3:
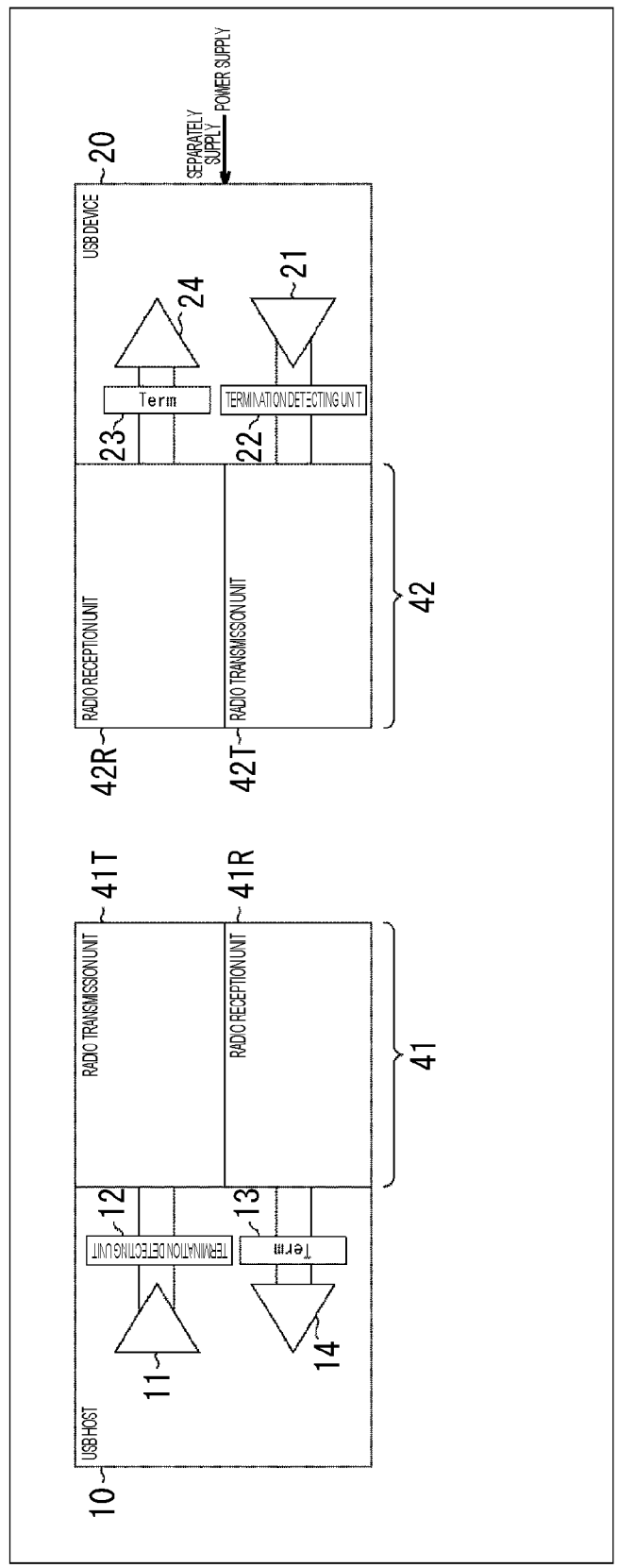
FIG. 3 is a diagram of an exemplary configuration of a communication system for transmitting data by modulated signals obtained by frequency conversion.

FIG. 3 is a diagram of an exemplary configuration of a communication system for transmitting data by modulated signals obtained by frequency conversion.

Note that, in FIG. 3, the components corresponding to those in a case of FIG. 1 are denoted with the same reference numerals, and the description thereof will be appropriately omitted below.

The communication system in FIG. 3 is common to a case of FIG. 1 in that the communication system includes the USB host 10 and the USB device 20.

However, the communication system in FIG. 3 is different from a case in FIG. 1 in that radio connectors 41 and 42 are provided instead of the USB cable 30.

The radio connectors 41 and 42 frequency-convert the baseband signal into a modulated signal in the millimeter wave band higher than the baseband signal by using a carrier in a predetermined frequency band such as a millimeter wave band and transmit data of the baseband signal by the modulated signal.

Therefore, in the communication system in FIG. 3, since the data transmission between the USB host 10 and the USB device 20 which are the electronic devices is performed by the modulated signals in the millimeter wave band via the radio connectors 41 and 42, it is possible to increase variation of the modes of the connection between the electronic devices.

Here, the (modulation) signal in the millimeter wave band is a signal having a frequency of about 30 to 300 GHz, that is, a wavelength of about one to 10 mm. Since the frequency of the signal in the millimeter wave band is high, data transmission at a high data rate is available by using the signal in the millimeter wave band, and communication using various waveguides as transmission paths can be performed. That is, by using the signal in the millimeter wave band, it is possible to perform communication (radio communication) using a free space as a transmission path with, for example, a small antenna. Furthermore, by using the signal in the millimeter wave band, it is possible to perform communication using a metallic line or a dielectric such as plastic as a transmission path.

The radio connectors 41 and 42 are made of a material such as a dielectric serving as a waveguide for transmitting the modulated signal (radio frequency (RF) signal) in the millimeter wave band.

Here, the radio connectors 41 and 42 may be made of metal, or may be made of a dielectric such as plastic or other non-metal.

In a case where the radio connectors 41 and 42 are made of non-metal, in comparison with a case where the radio connectors 41 and 42 are made of metal, waterproofing and dustproofing can be more easily made, and a degree of freedom in design can be higher.

The modulated signal in the millimeter wave band between the radio connectors 41 and 42 can be transmitted and received in a state where a gap is provided between the radio connectors 41 and 42 and a free space as the gap is used as a waveguide to be the transmission path.

Furthermore, the transmission and reception of the modulated signal in the millimeter wave band between the radio connectors 41 and 42 can be performed by bringing the radio connectors 41 and 42 into contact with each other and using the dielectrics configuring the radio connectors 41 and 42 as the waveguide to be the transmission path.

In addition, the modulated signal in the millimeter wave band is transmitted and received between the radio connectors 41 and 42 by connecting the radio connectors 41 and 42 with a metallic line and a dielectric which is not shown and using the metallic line and the dielectric as the waveguide to be the transmission path.

The above point similarly applies to the radio connector described later.

Similarly to the connector 31 of the USB cable 30, the radio connector 41 is detachable from the USB host 10 (part where connector 31 is attached/detached), and includes a radio transmission unit 41T and a radio reception unit 41R.

To the radio transmission unit 41T, a baseband signal (for example, differential signal to be output to + and − signal transmission lines for USB 3.0 in a case of USB 3.0) is supplied from the output I/F 11 of the USB host 10 via the termination detecting unit 12.

The radio transmission unit 41T frequency-converts the baseband signal supplied from the output I/F 11 into a modulated signal in the millimeter wave band, and transmits the modulated signal (to radio reception unit 42R of radio connector 42).

The radio reception unit 41R receives the modulated signal in the millimeter wave band transmitted from (radio transmission unit 42T of) the radio connector 42 attached to the USB device 20, and frequency-converts the received signal into the baseband signal (for example, differential signal to be output to + and − signal transmission lines for USB 3.0 in a case of USB 3.0).

Then, the radio reception unit 41R supplies the baseband signal to the input I/F 14 via the termination unit 13.

Similarly to the connector 32 of the USB cable 30, the radio connector 42 is detachable from the USB device 20 (part where the connector 32 is attached/detached), and includes a radio transmission unit 42T and a radio reception unit 42R.

To the radio transmission unit 42T, a baseband signal (for example, differential signal to be output to + and − signal transmission lines for USB 3.0 in a case of USB 3.0) is supplied from the output I/F 21 of the USB device 20 via the termination detecting unit 22.

The radio transmission unit 42T frequency-converts the baseband signal supplied from the output I/F 21 into a modulated signal in the millimeter wave band, and transmits the modulated signal (to radio reception unit 41R of radio connector 41).

The radio reception unit 42R receives the modulated signal in the millimeter wave band transmitted from the radio transmission unit 41T of the radio connector 41 attached to the USB host 10, and frequency-converts the received signal into a baseband signal (for example, differential signal to be output to + and − signal reception signals for USB 3.0 in a case of USB 3.0).

Then, the radio reception unit 42R supplies the baseband signal to the input I/F 24 via the termination unit 23.

Figure 4:
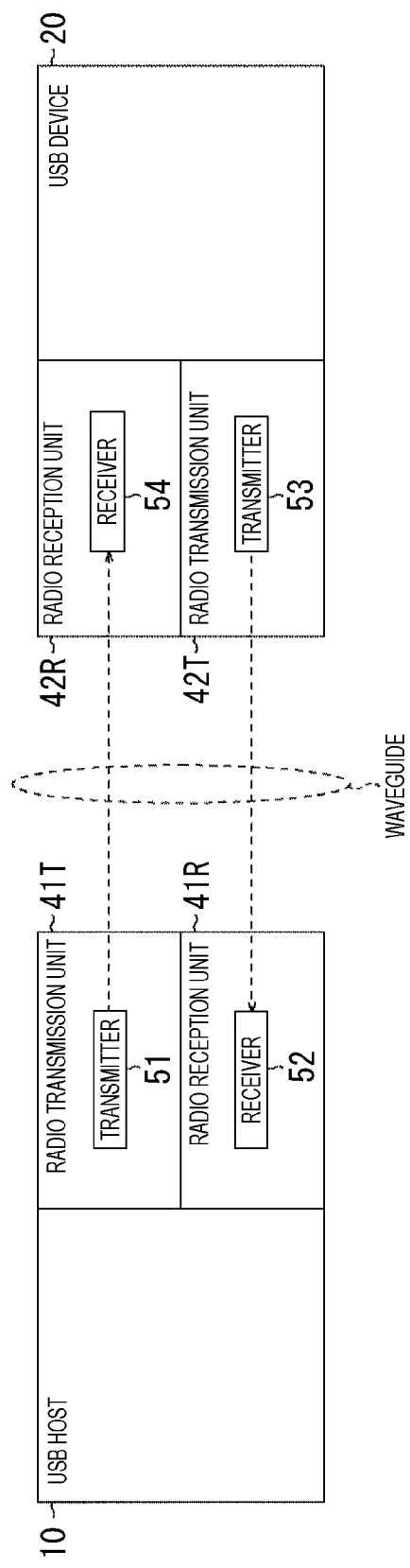
FIG. 4 is a block diagram of an exemplary configuration of a radio transmission unit 41T and a radio reception unit 41R, and a radio transmission unit 42T and a radio reception unit 42R.

FIG. 4 is a block diagram of an exemplary configuration of the radio transmission unit 41T and the radio reception unit 41R, and the radio transmission unit 42T and the radio reception unit 42R in FIG. 3.

The radio transmission unit 41T includes a transmitter 51, and the radio reception unit 41T has a receiver 52. The radio transmission unit 42T includes a transmitter 53, and the radio reception unit 42T has a receiver 54.

For example, the transmitter 51 transmits a signal (data) in a carrier wave communication system using a signal in the millimeter wave band as a carrier. That is, the transmitter 51 frequency-converts the baseband signal (supplied from USB host 10) into a modulated signal in the millimeter wave band and transmits the signal (to receiver 54).

The receiver 52 receives the modulated signal in the millimeter wave band transmitted (from transmitter 53) in the carrier wave communication system, and frequency-converts the received signal into the baseband signal and outputs the converted signal (to USB host 10).

For example, the transmitter 53 transmits a signal in the carrier wave communication system using millimeter wave signals in the frequency band same as that of the transmitter 51 or the millimeter wave signals in the frequency band different from that of the transmitter 51 as a carrier. That is, the transmitter 53 frequency-converts the baseband signal (supplied from USB device 20) into a modulated signal in the millimeter wave band and transmits the converted signal (to receiver 52).

The receiver 54 receives the modulated signal in the millimeter wave band transmitted (from transmitter 51) in the carrier wave communication system, and frequency-converts the received signal into a baseband signal and outputs the converted signal (to USB device 20).

Furthermore, in a case where the millimeter wave signals in the same frequency bands are used as the carriers in the transmitters 51 and 53, it is possible to perform half duplex communication between the radio connectors 41 and 42. However, even in a case where the transmitters 51 and 53 use the millimeter wave signals in the same frequency band as carriers, full duplex communication can be performed by isolating transmitters 51 and 53. Furthermore, by using the millimeter wave signals in the different frequency bands as carriers by the transmitters 51 and 53, it is possible to perform the full duplex communication between the radio connectors 41 and 42.

Figure 5:
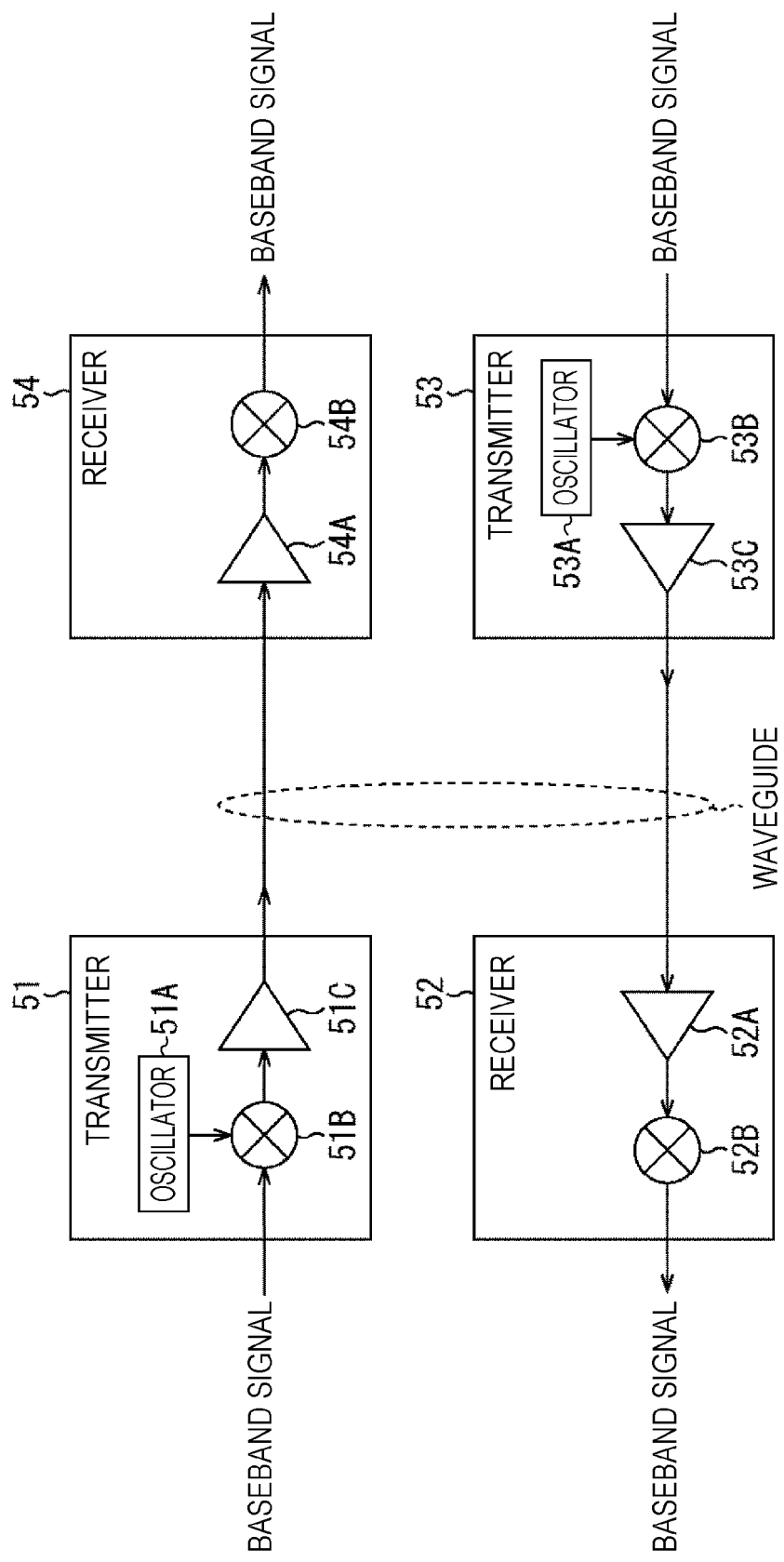
FIG. 5 is a diagram of an exemplary configuration of a transmitter 51 and a receiver 52, and a transmitter 53 and a receiver 54.

FIG. 5 is a diagram of an exemplary configuration of the transmitter 51 and the receiver 52, and the transmitter 53 and the receiver 54 in FIG. 4.

The transmitter 51 includes an oscillator 51A, a mixer 51B, and an amplifier 51C.

The oscillator 51A generates a carrier in the millimeter wave band such as 56 GHz by oscillation, and supplies the carrier to the mixer 51B.

Here, by using the carrier in the millimeter wave band such as 56 GHz, for example, it is possible to transmit a differential signal having a data rate of 11 Gbps at the maximum. For example, in the USB 3.0, since the maximum data rate is 5 giga bit per second (Gbps), by using the carrier in the millimeter wave band such as 56 GHz, the baseband signal of USB 3.0 (differential signal) can be transmitted with no problem.

The mixer 51B mixes (multiplies) the baseband signal supplied from the USB host 10 and the carrier from the oscillator 51A to frequency-convert the baseband signal by the carrier from the oscillator 51A. Then, for example, an amplitude shift keying (ASK) modulated signal in the millimeter wave band obtained by the frequency conversion is supplied to the amplifier 51C.

The amplifier 51C amplifies and transmits the modulated signal from the mixer 51B.

The receiver 52 includes an amplifier 52A and a mixer 52B.

The amplifier 52A receives and amplifies the modulated signal in the millimeter wave band transmitted from the transmitter 53, and supplies the amplified signal to the mixer 52B.

The mixer 52B performs squared detection for mixing the modulated signals in the millimeter wave band supplied from the amplifier 52A (squaring modulated signal) to frequency-convert the modulated signal in the millimeter wave band from the amplifier 52A into the baseband signal and supplies the converted signal to the USB host 10.

Furthermore, in addition to the frequency conversion from the modulated signal in the millimeter wave band into the baseband signal by the squared detection, the receiver 52 can perform frequency-conversion from the modulated signal into the baseband signal by detection other than the squared detection such as synchronous detection for reproducing the carrier and mixing the carrier and the modulated signal.

The transmitter 53 includes an oscillator 53A, a mixer 53B, and an amplifier 53C.

Since the oscillator 53A to the amplifier 53C are similarly configured to the oscillator 51A to the amplifier 51C of the transmitter 51, the description thereof will be omitted.

The receiver 54 includes an amplifier 54A and a mixer 54B.

Since the amplifier 54A and the mixer 54B are respectively configured similarly to the amplifier 52A and the mixer 52B of the receiver 52, the description thereof will be omitted.

In the transmitter 51 and the receiver 52, and the transmitter 53 and the receiver 54 configured as described above, the baseband signal is transmitted from the USB host 10 to the USB device 20 by transmitting the modulated signal in the millimeter wave band from the transmitter 51 and receiving the modulated signal by the receiver 54.

In addition, the baseband signal is transmitted from the USB device 20 to the USB host 10 by transmitting the modulated signal in the millimeter wave band from the transmitter 53 and receiving the modulated signal by the receiver 52.

Figure 6:
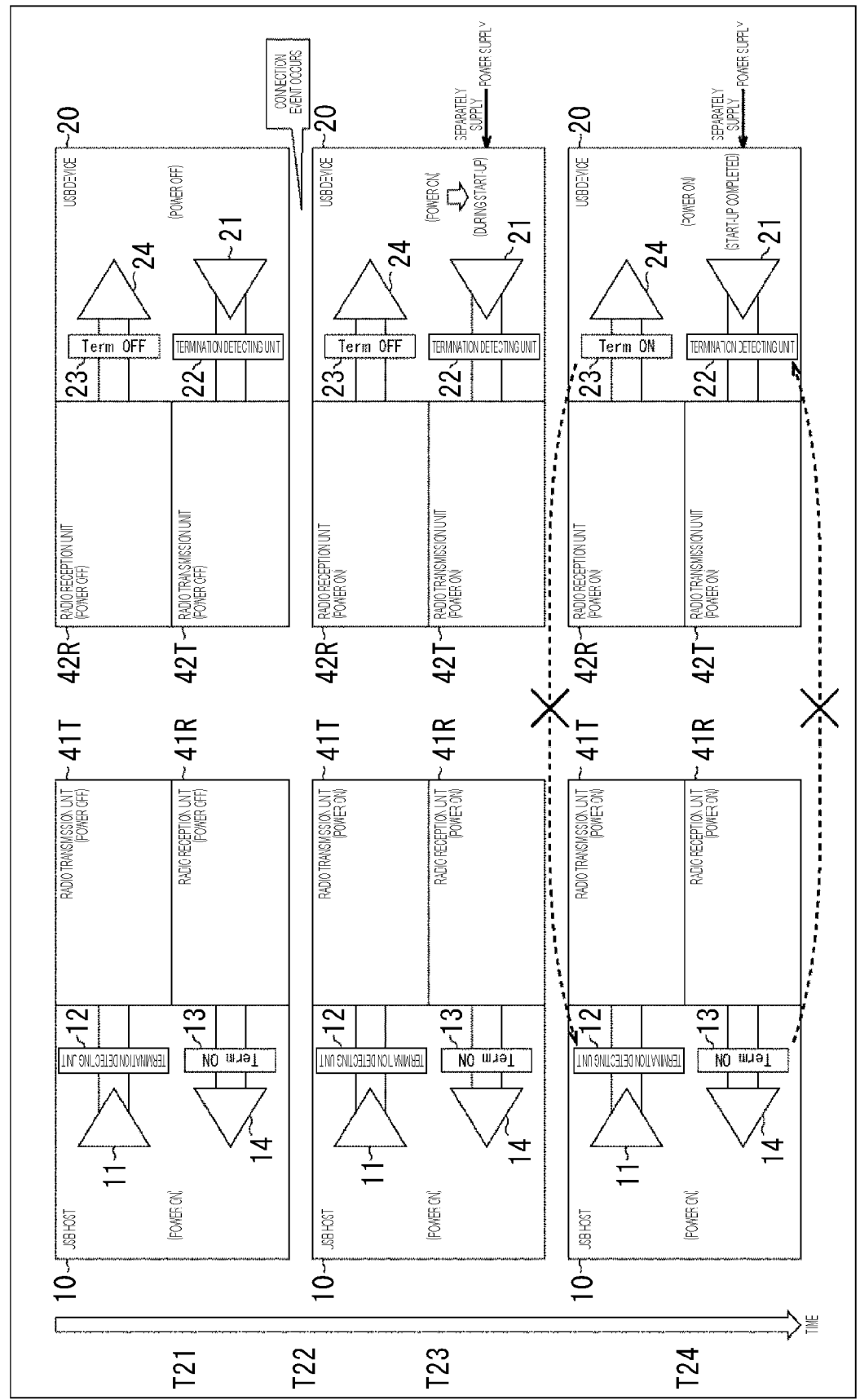
FIG. 6 is a diagram of an exemplary operation of the communication system.

FIG. 6 is a diagram to describe an exemplary operation of the communication system in FIG. 3 for transmitting data between the USB host 10 and the USB device 20 by transmitting the modulated signal between the radio connectors 41 and 42.

Furthermore, in the communication system in FIG. 3, as described with reference to FIG. 3, for example, the radio connectors 41 and 42 are made of dielectrics, and the modulated signal in the millimeter wave band can be transmitted/received between the radio connectors 41 and 42 by using the dielectrics forming the radio connectors 41 and 42 as the waveguide to be the transmission path.

In this case, it becomes difficult to supply the power from the USB host 10 to the USB device 20 by the bus power as described with reference to FIG. 2.

Therefore, in a case where the data transmission is performed between the USB host 10 and the USB device 20 by transmitting/receiving the modulated signal in the millimeter wave band, it is assumed that the USB device 20 operate by receiving power supply independently from the external device or receiving power supply from the built-in battery.

Furthermore, in FIG. 6, when a connection event occurs, the USB device 20 is turned on to start the operation.

In FIG. 6, for example, contact between the radio connectors 41 and 42 and the operation of the USB host 10 and the USB device 20 to start communication can be employed as the connection event.

At a time T21, the USB host 10 operates by receiving power supply from the external power supply or the built-in battery.

At the time T21, the USB host 10 is in a state of functioning as a USB host, and the termination unit 13 of the USB host 10 is turned on (Term ON).

Furthermore, at the time T21, the power supply of the USB device 20 is turned off.

Therefore, at the time T21, the USB device 20 is not yet in a state of functioning as a USB device, and the termination unit 23 of the USB device 20 is turned off (Term OFF).

Furthermore, at the time T21, that is, before the connection event occurs, the radio transmission unit 41T and the radio reception unit 41R of the radio connector 41 and the radio transmission unit 42T and the radio reception unit 42R of the radio connector 42 are turned off.

After the time T21, when the connection event occurs at a time T22, the state of the USB device 20 is changed from the OFF state to the ON state.

In addition, in the USB device 20, the power supplies of the radio transmission unit 42T and the radio reception unit 42R are changed from the OFF state to the ON state in response to the connection event.

In addition, in the USB host 10, the power supplies of the radio transmission unit 41T and the radio reception unit 41R are changed from the OFF state to the ON state in response to the connection event.

The USB device 20 starts the starting sequence at a time T23 after the power has been turned on.

While the starting sequence is performed in the USB device 20, the termination unit 23 is not yet turned on and remains in the OFF state (Term OFF).

At the time T24, when the starting sequence of the USB device 20 has been completed and the USB device 20 has been in the state of functioning as a USB device, the state of the termination unit 23 changes from the OFF state to the ON state (Term ON).

As described above, the termination unit 23 of the USB device 20 is turned on at the time T24. However, since the USB host 10 and the USB device 20 are connected to each other via the radio connectors 41 and 42 for transmitting/receiving the modulated signals, the termination detecting unit 12 of the USB host 10 cannot detect the termination unit 23 of the USB device 20 in the ON state.

Similarly, the termination detecting unit 22 of the USB device 20 cannot detect the termination unit 13 of the USB host 10 in the ON state.

As described above, since the USB host 10 cannot detect the termination unit 23 of the USB device 20, the output I/F 11 does not start to output the baseband signal to be transmitted to the electronic device 20.

Similarly, since the USB device 20 cannot detect the termination unit 13 of the USB host 10, the output I/F 21 does not output the baseband signal.

As a result, a malfunction such that the data transmission (exchange of baseband signal) is not performed between the USB host 10 and the USB device 20 occurs.

<Another Exemplary Configuration of Communication System Performing Data Transmission by Modulated Signal Obtained by Frequency Conversion>

Figure 7:
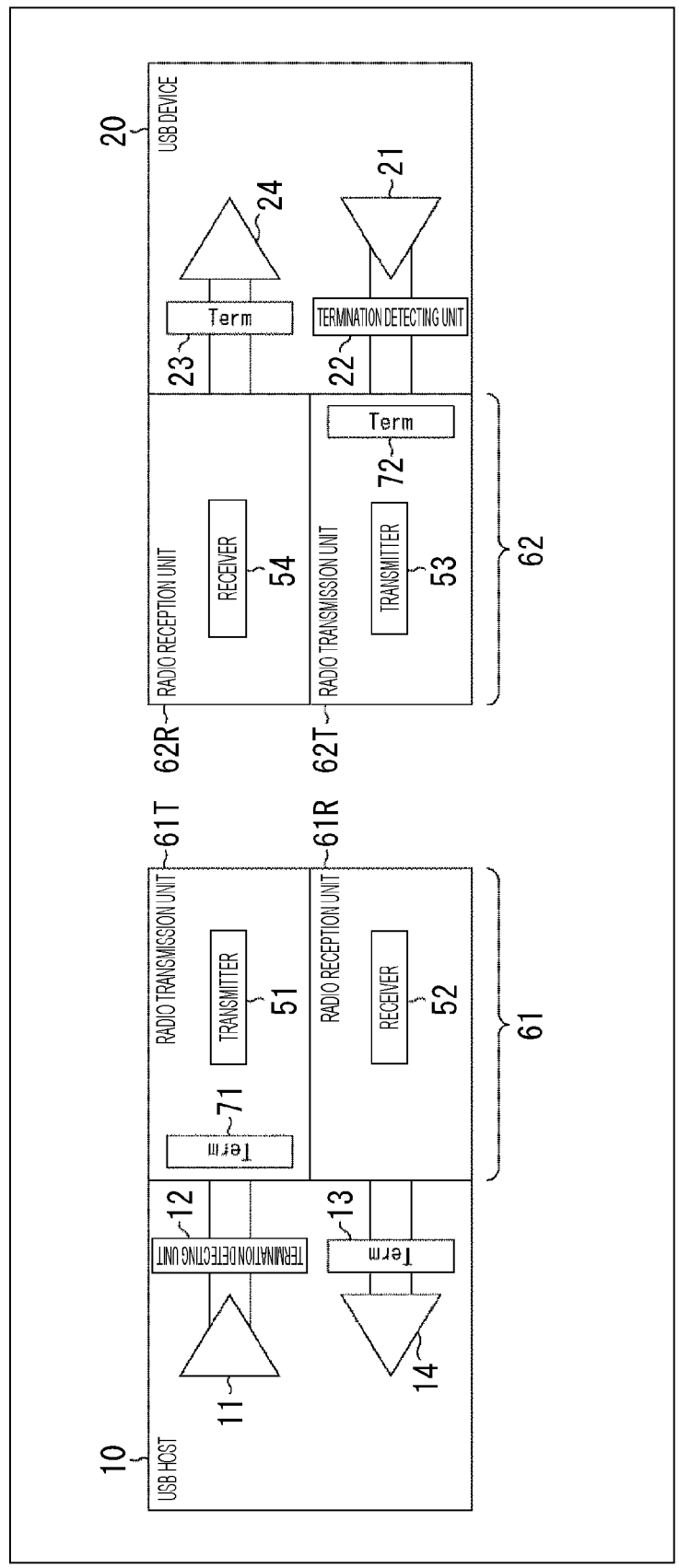
FIG. 7 is a diagram of another exemplary configuration of the communication system for transmitting data by the modulated signals obtained by the frequency conversion.

FIG. 7 is a diagram of another exemplary configuration of the communication system for transmitting the data by the modulated signals obtained by frequency conversion.

Note that, in FIG. 3, the components corresponding to those in a case of FIG. 3 are denoted with the same reference numerals, and the description thereof will be appropriately omitted below.

The communication system in FIG. 7 is common to a case of FIG. 3 in that the communication system includes the USB host 10 and the USB device 20.

However, the communication system in FIG. 7 is different from a case of FIG. 3 in that radio connectors 61 and 62 are provided instead of the radio connectors 41 and 42.

Similarly to the radio connectors 41 and 42, the radio connectors 61 and 62 frequency-convert the baseband signal into a modulated signal in the millimeter wave band higher than the baseband signal by using a carrier in a predetermined frequency band such as a millimeter wave band and transmit data of the baseband signal by the modulated signal.

Therefore, in the communication system in FIG. 7, since the data transmission between the USB host 10 and the USB device 20 which are the electronic devices is performed by modulated signals in the millimeter wave band via the radio connectors 61 and 62, it is possible to increase variation of the modes of the connection between the electronic devices.

Similarly to the radio connectors 41 and 42, the radio connectors 61 and 62 are made of a material such as a dielectric to be a waveguide for transmitting the modulated signal in the millimeter wave band and transmit/receive the modulated signal in the millimeter wave band.

Similarly to the radio connector 41, the radio connector 61 is detachable from the USB host 10, and includes a radio transmission unit 61T and a radio reception unit 61R.

The radio transmission unit 61T includes a transmitter 51 and a termination unit 71.

Therefore, the radio transmission unit 61T has the transmitter 51 in common with the radio transmission unit 41T in FIG. 4 and is different from the radio transmission unit 41T in FIG. 4 in that the termination unit 71 is newly provided.

The termination unit 71 is a corresponding mechanism corresponding to the termination unit 23 of the USB device 20 which is the partner device of the USB host 10. When the radio connector 61 is attached to the USB host 10, the termination unit 71 is connected to the termination detecting unit 12 of the USB host 10.

The radio reception unit 61R includes a receiver 52 and is configured similarly to the radio receiver 41R.

Similarly to the radio connector 42, the radio connector 62 is detachable from the USB device 20, and includes a radio transmission unit 62T and a radio reception unit 62R.

The radio transmission unit 62T includes a transmitter 53 and a termination unit 72.

Therefore, the radio transmission unit 62T includes the transmitter 53 in common with the radio transmission unit 42T in FIG. 4 and is different from the radio transmission unit 42T in FIG. 4 in that the termination unit 72 is newly provided.

The termination unit 72 is a corresponding mechanism corresponding to the termination unit 13 of the USB host 10 which is the partner device of the USB device 20. When the radio connector 62 is attached to the USB device 20, the termination unit 72 is connected to the termination detecting unit 22 of the USB device 20.

The radio reception unit 62R includes a receiver 54 and is configured similarly to the radio receiver 42R.

Figure 8:
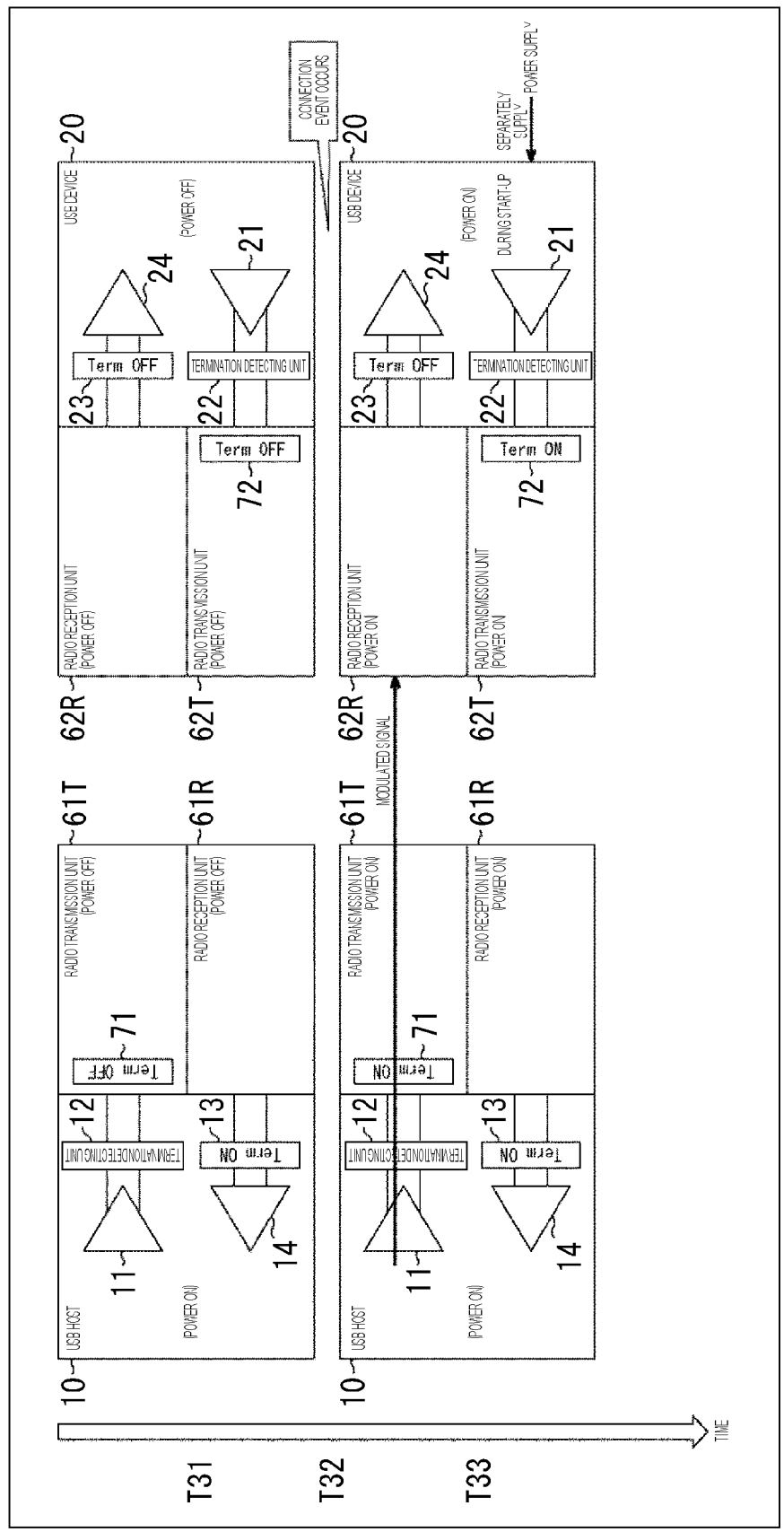
FIG. 8 is a diagram of an exemplary operation of the communication system.

FIG. 8 is a diagram to describe an exemplary operation of the communication system in FIG. 7 for transmitting data between the USB host 10 and the USB device 20 by transmitting the modulated signal between the radio connectors 61 and 62.

Here, in FIG. 8, the transmitter 51 and the receiver 52, the transmitter 53 and the receiver 54 are omitted.

At a time T31, the USB host 10 operates by receiving power supply from the external power supply or the built-in battery.

At the time T31, the USB host 10 is in a state of functioning as a USB host, and the termination unit 13 of the USB host 10 is in turned on (Term ON).

Furthermore, at the time T31, the USB device 20 is turned off.

Therefore, at the time T31, the USB device 20 is not yet in a state of functioning as a USB device, and the termination unit 23 of the USB device 20 is turned off (Term OFF).

Furthermore, at the time T31, that is, before the connection event occurs, the radio transmission unit 61T and the radio reception unit 61R of the radio connector 61 and the radio transmission unit 62T and the radio reception unit 62R of the radio connector 62 are turned off.

Therefore, the termination unit 71 of the radio transmission unit 61T and the termination unit 72 of the radio transmission unit 62T are turned off (Term OFF).

After the time T31, when the connection event occurs at a time T32, the state of the USB device 20 is changed from the OFF state to the ON state.

In addition, in the USB device 20, the power supplies of the radio transmission unit 62T and the radio reception unit 62R are changed from the OFF state to the ON state according to the connection event. As a result, the state of the termination unit 72 included in the radio transmission unit 62T also changes from the OFF state to the ON state (Term ON).

In addition, in the USB host 10, the power supplies of the radio transmission unit 61T and the radio reception unit 61R are changed from the OFF state to the ON state according to the connection event. As a result, the state of the termination unit 71 included in the radio transmission unit 61T also changes from the OFF state to the ON state (Term ON).

The USB device 20 starts the starting sequence at a time T33 after the power has been turned on.

Furthermore, at the time T33, in the USB host 10, the termination detecting unit 12 detects the termination unit 71 which has been turned on.

As described with reference to FIG. 7, since the termination unit 71 is the corresponding mechanism corresponding to the termination unit 23 of the USB device 20, the detection of the termination unit 71 by the termination detecting unit 12 is assumed as the detection of the termination unit 23 by the USB device 20.

Then, in the USB host 10, the output I/F 11 starts to output the baseband signal to be transmitted to the electronic device 20 in response to the detection of the termination unit 71 assumed as the detection of the termination unit 23.

The baseband signal output from the output I/F 11 is supplied to the radio transmission unit 61T, and (frequency) converted into the modulated signal and transmitted.

As described above, in the USB host 10, when the connection event occurs, at the time T33 immediately after the time T32 when the connection event has occurred, the termination detecting unit 12 detects the termination unit 71, and the output I/F 11 starts to output the baseband signal in response to the detection of the termination unit 71.

Then, the modulated signal of the baseband signal is transmitted from the radio transmission unit 61T.

The modulated signal is received by the radio reception unit 62R of the radio connector 62 attached to the USB device 20, converted into the baseband signal, and supplied to the USB device 20.

On the other hand, in the USB device 20, the starting sequence is started from the time T33 immediately after the time T32 when the connection event has occurred.

Therefore, the USB device 20 cannot immediately respond to the baseband signal from the USB host 10 supplied from the radio reception unit 62R.

That is, the USB device 20 cannot respond to the baseband signal from the USB host 10 during the execution of the starting sequence, and responds to the baseband signal from the USB host 10 at least after the starting sequence ends.

As described above, in a case where the USB device 20 does not immediately respond to the baseband signal from the USB host 10, the USB host 10 may time out. As a result, a malfunction such that the data transmission (exchange of baseband signal) is not performed between the USB host 10 and the USB device 20 occurs.

Therefore, the present technology increases variation of the modes of the connection between the electronic devices, that is, for example, the USB host 10 and the USB device 20 and prevents the malfunction such that the data transmission cannot be performed.

<One Embodiment of Communication System to which the Present Technology has been Applied>

Figure 9:
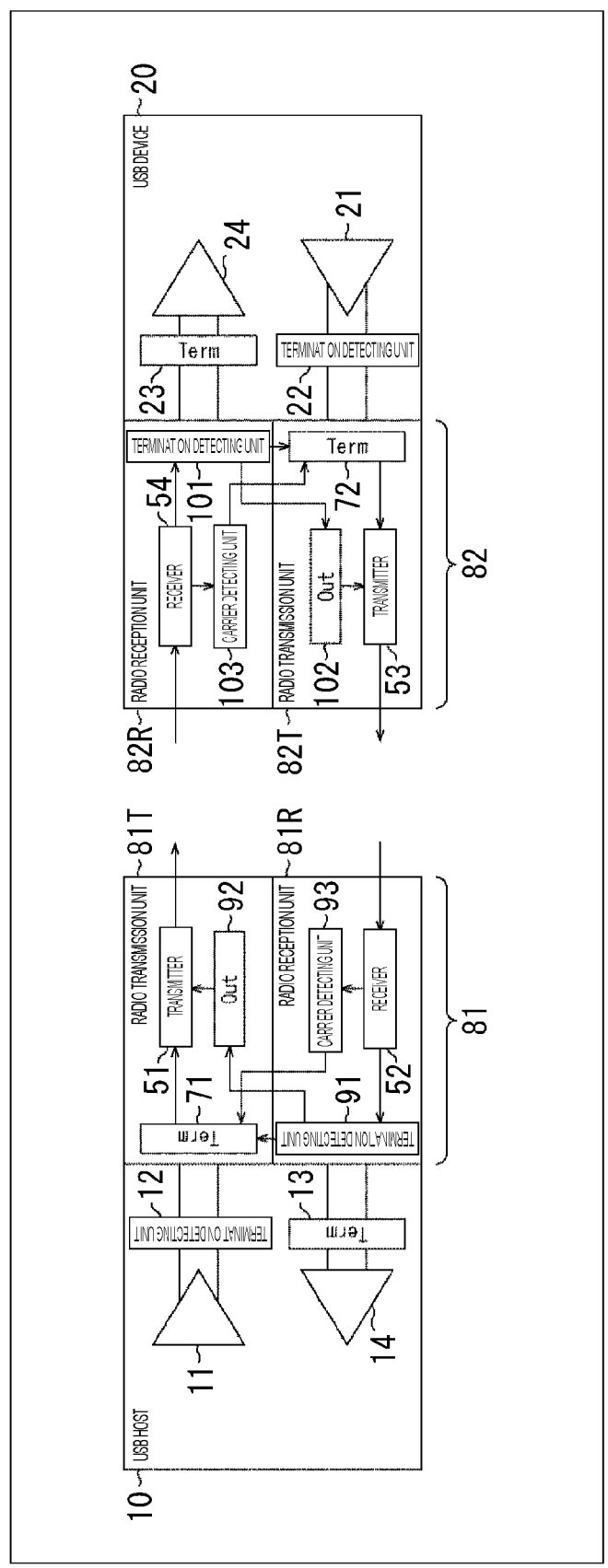
FIG. 9 is a diagram of an exemplary configuration of an embodiment of a communication system to which the present technology has been applied.

FIG. 9 is a diagram of an exemplary configuration of an embodiment of a communication system to which the present technology has been applied.

Note that, in FIG. 9, the components corresponding to those in a case of FIG. 7 are denoted with the same reference numerals, and the description thereof will be appropriately omitted below.

The communication system in FIG. 9 is common to a case of FIG. 7 in that the communication system includes the USB host 10 and the USB device 20.

However, the communication system in FIG. 9 is different from a case of FIG. 7 in that radio connectors 81 and 82 are provided instead of the radio connectors 61 and 62.

Similarly to the radio connectors 61 and 62, the radio connectors 81 and 82, for example, frequency-convert the baseband signal into the modulated signal in the millimeter wave band, and perform data transmission of the baseband signal by the modulated signal.

Therefore, in the communication system in FIG. 9, since the data transmission between the USB host 10 and the USB device 20 which are the electronic devices is performed by the modulated signals in the millimeter wave band via the radio connectors 81 and 82, it is possible to increase variation of the modes of the connection between the electronic devices.

Similarly to the radio connectors 61 and 62, the radio connectors 81 and 82 are made of a material such as a dielectric to be a waveguide for transmitting the modulated signal in the millimeter wave band and transmit/receive the modulated signal in the millimeter wave band.

Similarly to the radio connector 61, the radio connector 81 is detachable from the USB host 10, and includes a radio transmission unit 81T and a radio reception unit 81R.

The radio transmission unit 81T includes a transmitter 51, a termination unit 71, and an output controller (Out) 92.

Therefore, the radio transmission unit 81T includes the transmitter 51 and the termination unit 71 in common with the radio transmission unit 61T in FIG. 7, and the radio transmission unit 81T is different from the radio transmission unit 61T in FIG. 7 in that the output controller 92 is newly provided.

The output controller 92 controls the transmission (output) of the modulated signal by the transmitter 51 in response to the detection of the termination unit 13 by the termination detecting unit 91 described later.

Furthermore, in the radio transmission unit 81T, when the termination unit 13 is detected by the termination detecting unit 91, which will be described later, and the carrier is detected by the carrier detecting unit 93, which will also be described later, the state of the termination unit 71 changes from the OFF state to the ON state.

The radio reception unit 81R includes a receiver 52, a termination detecting unit 91, and a carrier detecting unit 93.

Therefore, the radio reception unit 81R includes the receiver 52 in common with the radio reception unit 61R in FIG. 7, and the radio reception unit 81R is different from the radio reception unit 61R in FIG. 7 in that the termination detecting unit 91 and the carrier detecting unit 93 are newly provided.

The termination detecting unit 91 is configured to be connected to the termination unit 13 of the USB host 10 when the radio connector 81 is attached to the USB host 10.

The termination detecting unit 91 detects the termination unit 13 in the ON state and supplies the detection of the termination unit 13 to the termination unit 71 and the output controller 92.

By monitoring the receiver 52, the carrier detecting unit 93 detects the modulated signal transmitted from (radio transmission unit 82T of) the radio connector 82, and supplies the detection of the modulated signal to the termination unit 71.

Here, the modulated signal detected by the carrier detecting unit 93 includes a non-modulated signal, that is, a carrier.

Similarly to the radio connector 62, the radio connector 82 is detachable from the USB device 20, and includes a radio transmission unit 82T and a radio reception unit 82R.

The radio transmission unit 82T includes a transmitter 53, a termination unit 72, and an output controller (Out) 102.

Therefore, the radio transmission unit 82T includes the transmitter 53 and the termination unit 72 in common with the radio transmission unit 62T in FIG. 7, and the radio transmission unit 82T is different from the radio transmission unit 62T in FIG. 7 in that the output controller 102 is newly provided.

The radio reception unit 82R includes a receiver 54, a termination detecting unit 101, and a carrier detecting unit 103.

Therefore, the radio reception unit 82R includes the receiver 54 in common with the radio reception unit 61R in FIG. 7, and the radio reception unit 81R is different from the radio reception unit 62R in FIG. 7 in that the termination detecting unit 101 and the carrier detecting unit 103 are newly provided.

The termination detecting unit 101 and the carrier detecting unit 103 are, respectively, configured similarly to the termination detecting unit 91 and the carrier detecting unit 93.

That is, the termination detecting unit 101 is configured to be connected to the termination unit 23 of the USB device 20 when the radio connector 82 is attached to the USB device 20.

The termination detecting unit 101 detects the termination unit 23 in the ON state and supplies the detection of the termination unit 23 to the termination unit 72 and the output controller 102.

The output controller 102 controls transmission of the modulated signal by the transmitter 53 in response to the detection of the termination unit 23 by the termination detecting unit 101.

By monitoring the receiver 54, the carrier detecting unit 103 detects the modulated signal (including carrier) transmitted from (radio transmission unit 81T of) the radio connector 81, and supplies the detection of the modulated signal to the termination unit 72.

Furthermore, in the radio transmission unit 82T, the state of the termination unit 72 changes from the OFF state to the ON state when the termination detecting unit 101 detects the termination unit 13 and the carrier detecting unit 103 detects the carrier.

Figure 10:
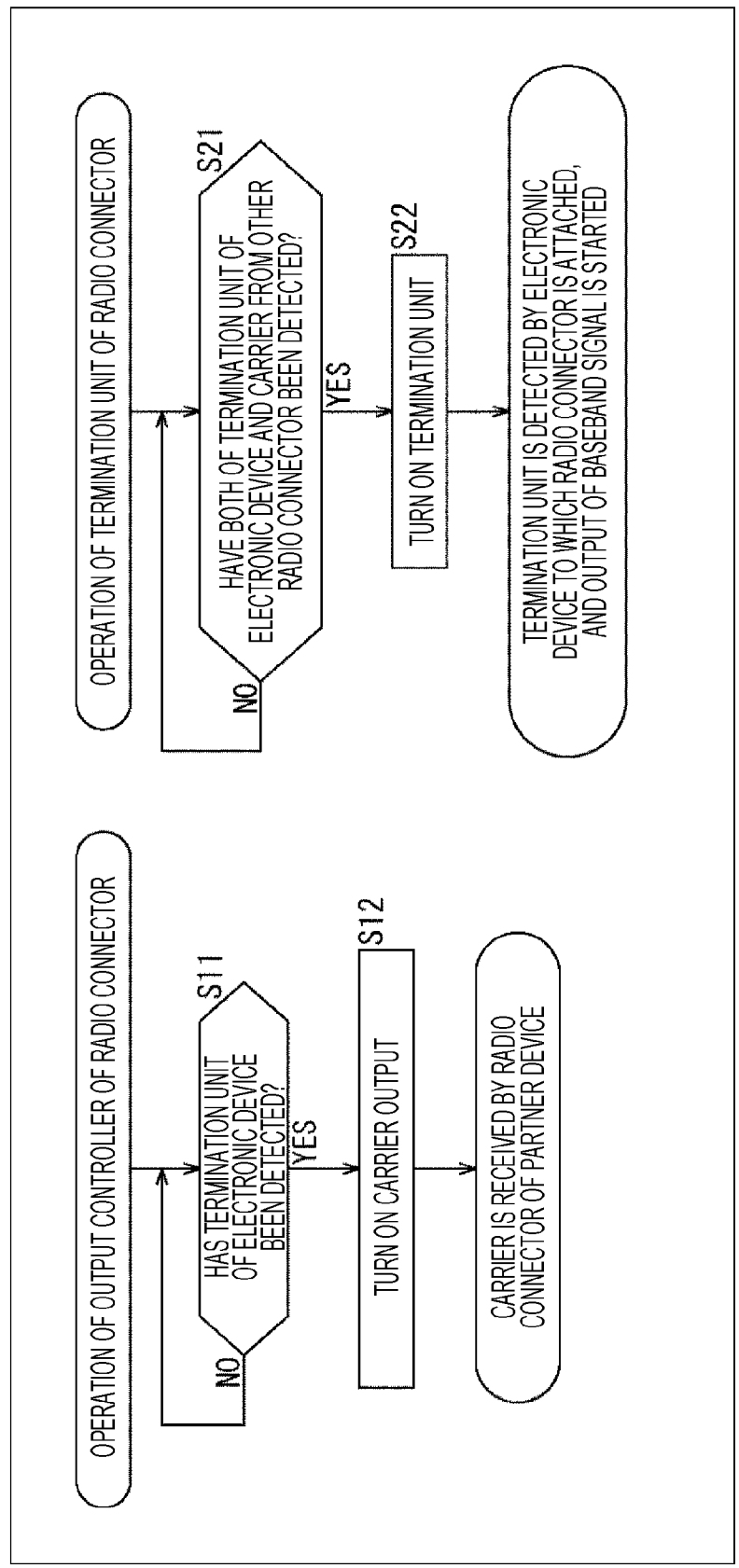
FIG. 10 is a flowchart to describe exemplary operations of output controllers 92 and 102 and termination units 71 and 72.

FIG. 10 is a flowchart to describe exemplary operations of the output controllers 92 and 102 and the termination units 71 and 72 in FIG. 9

The output controller 92 of the radio connector 81 attached to the USB host 10 waits until the termination detecting unit 91 detects the termination unit 13 of the USB host 10 to which the radio connector 81 is attached in step S11.

Then, in a case where the termination detecting unit 91 has detected the termination unit 13, the processing proceeds from step S11 to step S12. The output controller 92 controls the transmitter 51 to start to transmit a non-modulated signal (carrier), and the processing is terminated.

When the transmitter 51 starts to transmit the modulated signal, the modulated signal is received by the receiver 54 of the radio connector 82 attached to the USB device 20 which is the partner device of the USB host 10.

On the other hand, the termination unit 71 of the radio connector 81 attached to the USB host 10 waits until the termination detecting unit 91 detects the termination unit 13 of the USB host 10 to which the radio connector 81 is attached and the carrier detecting unit 93 detects the carrier of the modulated signal transmitted from the transmitter 53 of the other radio connector, that is, the radio connector 82 attached to the USB device 20 which is the partner device of the USB host 10 in step S21.

Then, in a case where the termination detecting unit 91 has detected the termination unit 13 of the USB host 10 and the carrier detecting unit 93 has detected the carrier of the modulated signal transmitted from the radio connector 82 attached to the USB device 20, the processing proceeds from step S21 to step S22. Then, the state of the termination unit 71 changes from the OFF state to the ON state, and the processing is terminated.

When the termination unit 71 of the radio connector 81 is turned on, the termination detecting unit 12 of the USB host 10 to which the radio connector 81 is attached detects the termination unit 71 which has been turned on.

The termination unit 71 of the radio connector 81 attached to the USB host 10 corresponds to the termination unit 23 of the USB device 20 which is the partner device of the USB host 10. When the termination unit 71 is detected by the termination detecting unit 12 of the USB host 10, the output I/F 11 starts to output the baseband signal in response to the detection of the termination unit 71.

The baseband signal output from the output I/F 11 is supplied to the transmitter 51 via the termination detecting unit 12 and the termination unit 71. The transmitter 51 converts the baseband signal from the output I/F 11 into the modulated signal and transmits the converted signal.

The output controller 102 and the termination unit 72 of the radio connector 82 operate similarly to the output controller 92 and the termination unit 71 of the radio connector 81.

That is, in step S11, the output controller 102 of the radio connector 82 attached to the USB device 20 waits until the termination detecting unit 101 detects the termination unit 23 of the USB device 20 to which the radio connector 82 is attached.

Then, in a case where the termination detecting unit 101 has detected the termination unit 23, the processing proceeds from step S11 to step S12. The output controller 102 controls the transmitter 53 to start to transmit (carrier of) the modulated signal, and the processing is terminated.

When the transmitter 53 starts to transmit the modulated signal, the modulated signal is received by the receiver 52 of the radio connector 81 attached to the USB host 10 which is the partner device of the USB device 20.

On the other hand, the termination unit 72 of the radio connector 82 attached to the USB device 20 waits until the termination detecting unit 101 detects the termination unit 23 of the USB device 20 to which the radio connector 82 is attached and the carrier detecting unit 103 detects the carrier of the modulated signal transmitted from the transmitter 51 of the other radio connector, that is, the radio connector 81 attached to the USB host 10 which is the partner device of the USB device 20 in step S21.

Then, in a case where the termination detecting unit 101 has detected the termination unit 23 of the USB device 20 and the carrier detecting unit 103 has detected the carrier of the modulated signal transmitted from the radio connector 81 attached to the USB host 10, the processing proceeds from step S21 to step S22. Then, the state of the termination unit 72 changes from the OFF state to the ON state, and the processing is terminated.

When the termination unit 72 of the radio connector 82 is turned on, the termination detecting unit 22 of the USB device 20 to which the radio connector 82 is attached detects the termination unit 72 which has been turned on.

The termination unit 72 of the radio connector 82 attached to the USB device 20 corresponds to the termination unit 13 of the USB host 10 which is the partner device of the USB device 20 and the termination detecting unit 22 of the USB device 20 detects the termination unit 72, the output I/F 21 starts to output the baseband signal in response to the detection of the termination unit 72.

The baseband signal output from the output I/F 21 is supplied to the transmitter 53 via the termination detecting unit 22 and the termination unit 72. The transmitter 53 converts the baseband signal from the output I/F 21 into the modulated signal and transmits the converted signal.

Figure 11:
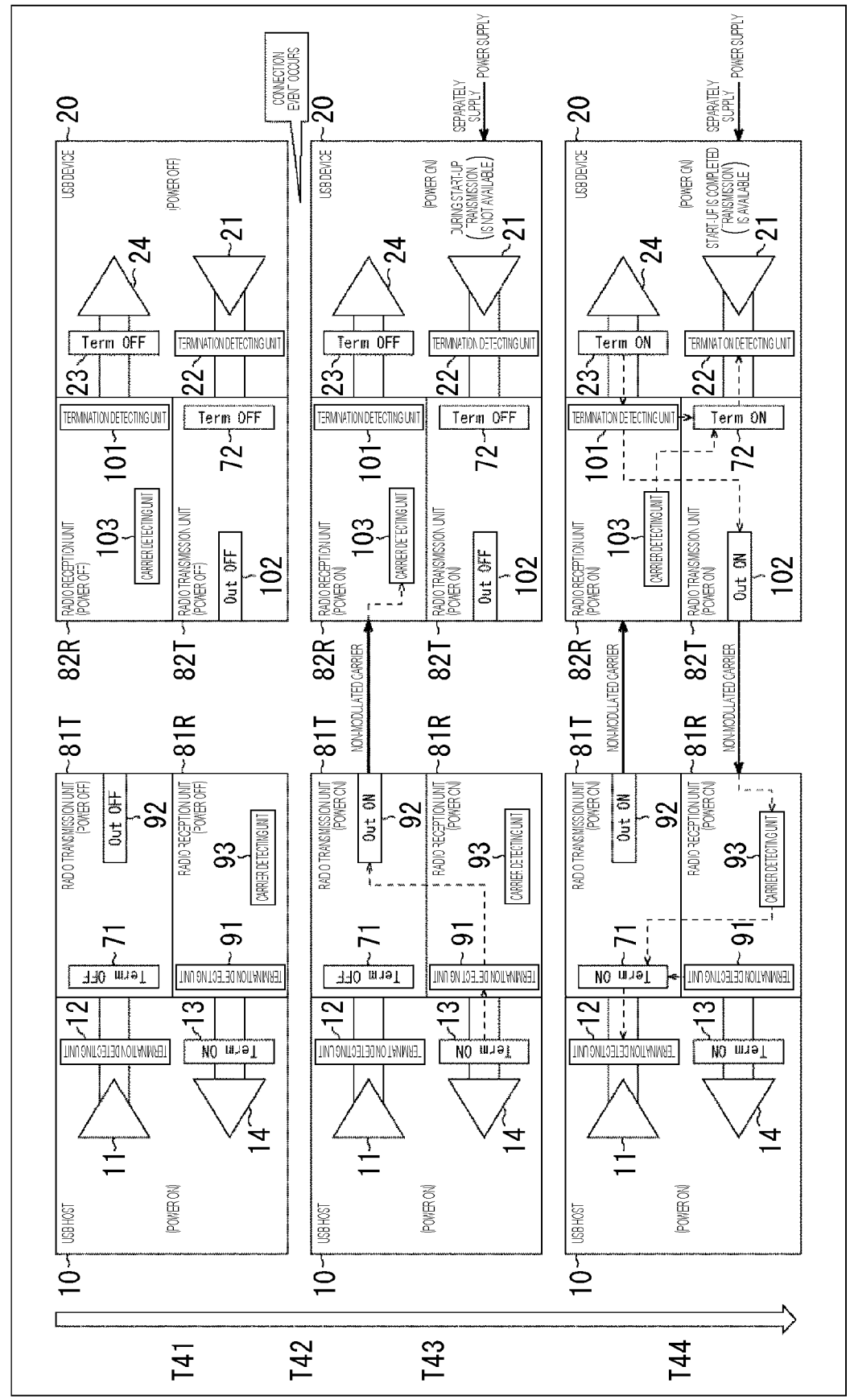
FIG. 11 is a diagram of an exemplary operation of the communication system.

FIG. 11 is a diagram to describe an exemplary operation of the communication system in FIG. 9 for transmitting data between the USB host 10 and the USB device 20 by transmitting the modulated signal between the radio connectors 81 and 82.

Here, in FIG. 11, the transmitter 51 and the receiver 52, the transmitter 53 and the receiver 54 are omitted.

At a time T41, the USB host 10 operates by receiving power supply from the external power supply or the built-in battery.

At the time T41, the USB host 10 is in a state of functioning as a USB host, and the termination unit 13 of the USB host 10 is turned on (Term ON).

Furthermore, at the time T41, the USB device 20 is turned off.

Therefore, at the time T41, the USB device 20 is not yet in a state of functioning as a USB device, and the termination unit 23 of the USB device 20 is turned off (Term OFF).

Furthermore, at the time T41, that is, before the connection event occurs, the radio transmission unit 81T and the radio reception unit 81R of the radio connector 81 and the radio transmission unit 82T and the radio reception unit 82R of the radio connector 82 are turned off.

Therefore, the termination unit 71 of the radio transmission unit 81T and the termination unit 72 of the radio transmission unit 82T are turned off (Term OFF).

In addition, the output controller 92 of the radio transmission unit 81T is in the OFF state (Out OFF) in which the transmitter 51 does not output the modulated signal. Similarly, the output controller 102 of the radio transmission unit 82T is in the OFF state (Out OFF) in which the transmitter 53 does not output the modulated signal.

After the time T41, when the connection event occurs at a time T42, the state of the USB device 20 is changed from the OFF state to the ON state.

The USB device 20 starts the starting sequence at a time T43 after the power has been turned on.

While the starting sequence is performed in the USB device 20, the termination unit 23 is not yet turned on and remains in the OFF state (Term OFF).

Furthermore, when the USB device 20 is turned on by the occurrence of the connection event, the radio transmission unit 82T and the radio reception unit 82R of the radio connector 82 attached to the USB device 20 are turned on.

With this operation, the termination detecting unit 101 of the radio reception unit 82R can detect the termination unit 23 of the USB device 20. However, at the time T43, since the termination unit 23 remains in the OFF state as described above, the termination unit 23 is not detected.

On the other hand, at the time T43, the states of the radio transmission unit 81T and the radio reception unit 81R of the radio connector 81 attached to the USB host 10 change from the OFF state to the ON state in response to the occurrence of the connection event.

The radio reception unit 81R is turned on so that the termination detecting unit 91 of the radio reception unit 81R detects the termination unit 13 of the USB host 10 which has been turned on.

Then, in the radio transmission unit 81T, the output controller 92 is turned on (Out ON), in which the transmitter 51 outputs the modulated signal, in response to the detection of the termination unit 13 by the termination detecting unit 91. As a result, a modulated signal (non-modulated signal) (non-modulated carrier) is transmitted from the transmitter 51.

The modulated signal transmitted from (transmitter 51 of) the radio transmission unit 81T is detected by the carrier detecting unit 103 of (receiver 54 of) the radio reception unit 82R.

Subsequently, at the time T44, when the starting sequence of the USB device 20 has been completed and the USB device 20 has been in the state of functioning as a USB device, the state of the termination unit 23 changes from the OFF state to the ON state (Term ON).

The termination unit 23 which has been turned on is detected by the termination detecting unit 101 of the radio reception unit 82R.

The output controller 102 of the radio transmission unit 82T is in the ON state (Out ON) in which the transmitter 53 outputs the modulated signal in response to the detection of the termination unit 23 by the termination detecting unit 101. As a result, a modulated signal (non-modulated signal) (non-modulated carrier) is transmitted from the transmitter 53.

Furthermore, the state of the termination unit 72 of the radio transmission unit 82T changes from the OFF state to the ON state (Term ON) in response to the detection of the termination unit 23 by the termination detecting unit 101 and the detection of the modulated signal (carrier) by the carrier detecting unit 103 at time T43.

When the termination unit 72 is turned on, the termination detecting unit 22 of the USB device 20 detects the termination unit 72 which has been turned on. In response to the detection of the termination unit 72 by the termination detecting unit 22, the output I/F 21 starts to output the baseband signal (to be in the state where start of output is available).

In the USB host 10, the modulated signal transmitted from (transmitter 53 of) the radio transmission unit 82T is detected by the carrier detecting unit 93 of (receiver 52 of) the radio reception unit 81R.

The state of the termination unit 71 of the radio transmission unit 81R changes from the OFF state to the ON state (Term ON) in response to the detection of the modulated signal (carrier) by the carrier detecting unit 103 and the detection of the termination unit 13 by the termination detecting unit 91 at the time T43.

When the termination unit 71 is turned on, the termination detecting unit 12 of the USB host 10 detects the termination unit 71 which has been turned on. In response to the detection of the termination unit 71 by the termination detecting unit 12, the output I/F 11 starts to output the baseband signal.

The baseband signal output from the output I/F 11 is supplied to the radio transmission unit 81T, and converted into the modulated signal and transmitted.

At the timing at which the modulated signal of the baseband signal output from the output I/F 11 is transmitted in the radio transmission unit 81T of the USB host 10, the starting sequence of the USB device 20 is completed, and the output I/F 21 can output the baseband signal.

Therefore, as described with reference to FIG. 8, since the USB device 20 is performing the starting sequence, the USB device 20 does not immediately respond to the baseband signal from the USB host 10 and the USB host 10 times out. Therefore, the malfunction such that the data transmission (exchange of baseband signal) is not performed between the USB host 10 and the USB device 20 can be prevented.

That is, while the variation of the modes of the connection between the USB host 10 and the USB device 20 is increased, the malfunction such that the data transmission cannot be performed can be prevented.

<Another Embodiment of Communication System to which the Present Technology has been Applied>

Figure 12:
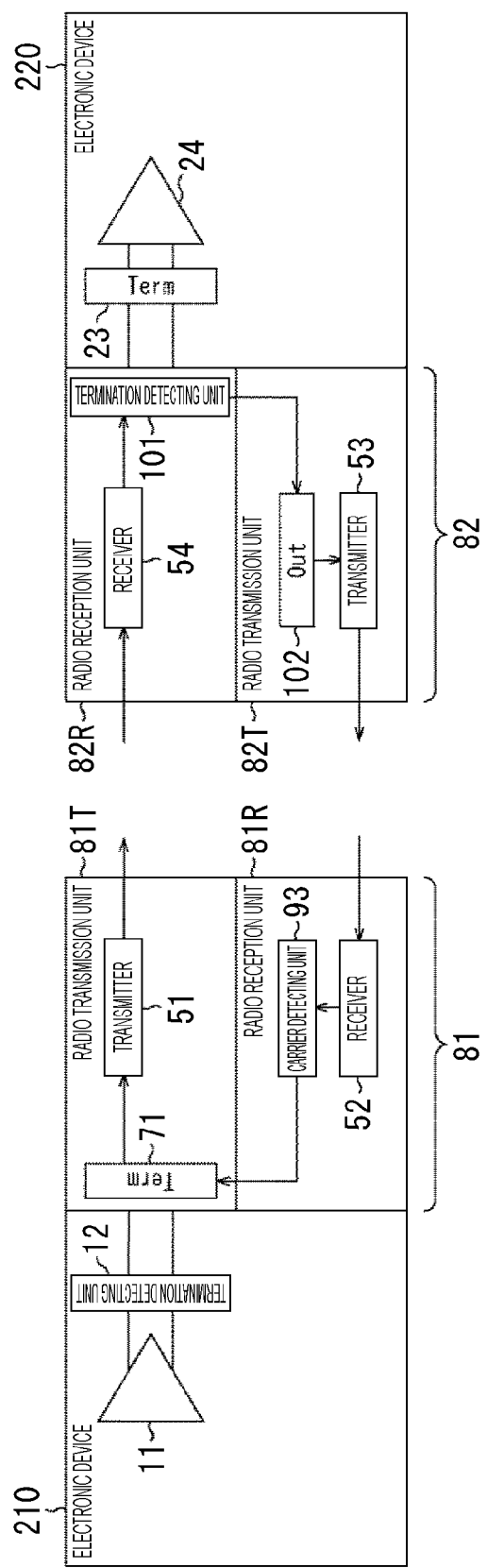
FIG. 12 is a diagram of an exemplary configuration of another embodiment of the communication system to which the present technology has been applied.

FIG. 12 is a diagram of an exemplary configuration of another embodiment of the communication system to which the present technology has been applied.

Note that, in FIG. 12, the components corresponding to those in a case of FIG. 9 are denoted with the same reference numerals, and the description thereof will be appropriately omitted below.

The communication system in FIG. 12 is similar to a case of FIG. 9 in that the communication system includes the radio connectors 81 and 82.

However, the communication system in FIG. 12 is different from a case of FIG. 9 in that the communication system includes electronic devices 210 and 220 instead of the USB host 10 and the USB device 20.

The electronic device 210 is similar to the USB host 10 in that both include the output I/F 11 and the termination detecting unit 12. Whereas, the electronic device 210 is different from the USB host 10 in that the termination unit 13 and the input I/F 14 are not included.

The electronic device 220 is similar to the USB device 20 in that both include the termination unit 23 and the input I/F 24. Whereas, the electronic device 220 is different from the USB device 20 in that the output I/F 21 and the termination detecting unit 22 are not included.

Similar to the USB host 10, the electronic device 210 has a detachable radio connector 81. Similar to the USB device 20, the electronic device 220 has a detachable radio connector 82.

In addition, in the communication system in FIG. 12, in the radio connector 81 is similar to a case of FIG. 9 in that the radio transmission unit 81T includes the transmitter 51 and the termination unit 71 and the radio reception unit 81R includes the receiver 52 and the carrier detecting unit 93.

However, in FIG. 12, the radio connector 81 is different from a case of FIG. 9, in which the radio connector 81 includes the termination detecting unit 91 and the output controller 92, in that the radio transmission unit 81T does not include the output controller 92 and the radio reception unit 81R does not include the termination detecting unit 91.

Furthermore, in the communication system in FIG. 12, the radio connector 82 is similar to the case of FIG. 9 in that the radio communication unit 82T includes the transmitter 53 and the output controller 102 and the radio reception unit 82R includes the receiver 54 and the termination detecting unit 101.

However, in FIG. 12, the radio connector 82 is different from a case of FIG. 9, in which the radio connector 82 includes the termination unit 72 and the carrier detecting unit 103, in that the radio communication unit 82T does not include the termination unit 72 and the radio reception unit 82R does not include the carrier detecting unit 103.

As described above, in FIG. 12, since the electronic device 210 does not include the termination unit 13 and the input I/F 14 and the electronic device 220 does not include the output I/F 21 and the termination detecting unit 22, the baseband signal is transmitted from the electronic device 210 to the electronic device 220 in one direction, and the baseband signal is not transmitted from the electronic device 220 to the electronic device 210.

Figure 13:
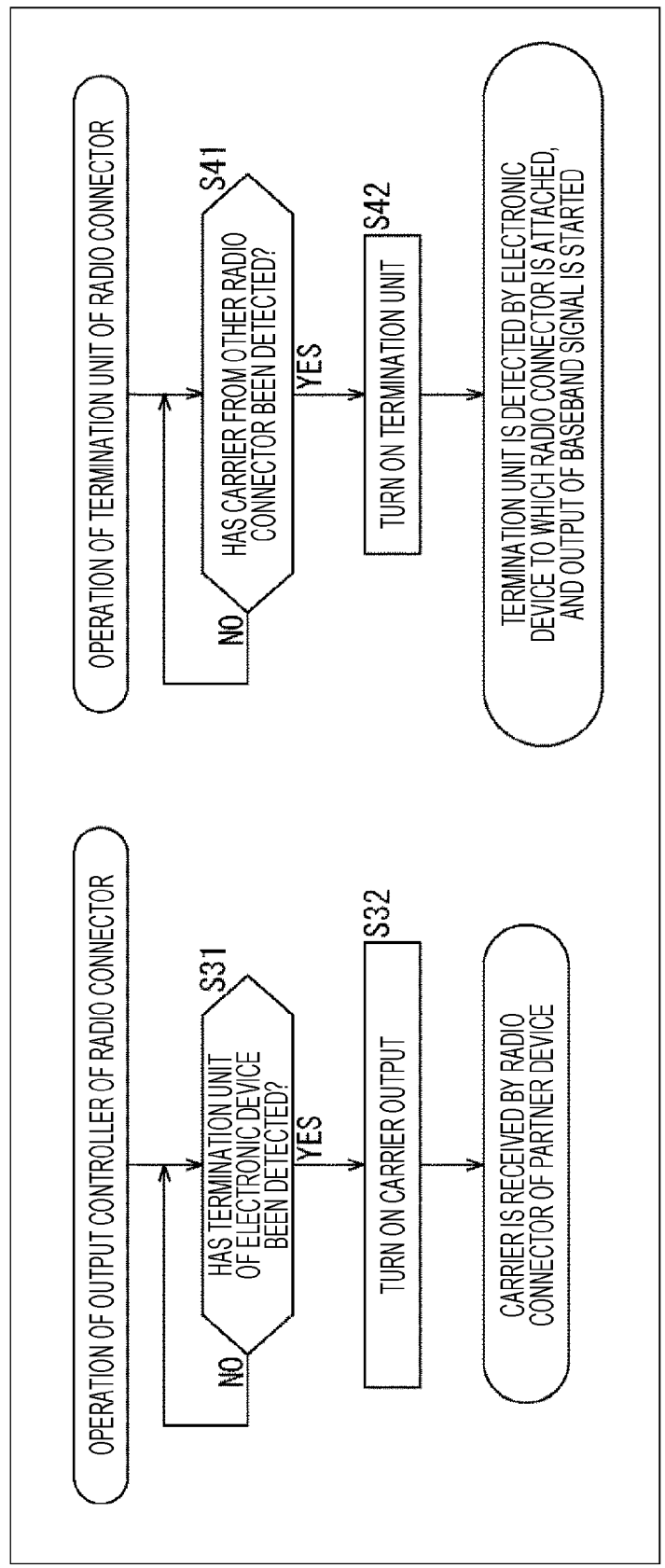
FIG. 13 is a flowchart of exemplary operations of the output controller 102 and the termination unit 71.

FIG. 13 is a flowchart of exemplary operations of the output controller 102 and the termination unit 71 in FIG. 12 in a case where the baseband signal is transmitted from the electronic device 210 to the electronic device 220 in one direction.

In a case where the baseband signal is transmitted from the electronic device 210 to the electronic device 220 in one direction, the output controller 102 of the radio connector 82 attached to the electronic device 220 executes processing in steps S31 and S32 similar to that in steps S11 and S12 in FIG. 10.

That is, in step S31, the output controller 102 of the radio connector 82 attached to the electronic device 220 waits until the termination detecting unit 101 detects the termination unit 23 of the electronic device 220 to which the radio connector 82 is attached.

Then, in a case where the termination detecting unit 101 has detected the termination unit 23, the processing proceeds from step S31 to step S32. The output controller 102 controls the transmitter 53 to start to transmit (carrier of) the modulated signal, and the processing is terminated.

When the transmitter 53 starts to transmit the modulated signal, the modulated signal is received by the receiver 52 of the radio connector 81 attached to the electronic device 210 which is the partner device of the electronic device 220.

On the other hand, the termination unit 71 of the radio connector 81 attached to the electronic device 210 waits until the carrier detecting unit 93 detects (carrier of) the modulated signal transmitted from the transmitter 53 of the other radio connector, that is, the radio connector 82 attached to the electronic device 220 which is the partner device of the electronic device 210 in step S41.

Then, in a case where the modulated signal transmitted from the radio connector 82 attached to the electronic device 220 is detected by the carrier detecting unit 93, the processing proceeds from step S41 to step S42. Then, the state of the termination unit 71 changes from the OFF state to the ON state, and the processing is terminated.

When the termination unit 71 of the radio connector 81 is turned on, the termination detecting unit 12 of the electronic device 210 to which the radio connector 81 is attached detects the termination unit 71 which has been turned on.

When the termination detecting unit 12 of the electronic device 210 detects the termination unit 71, the output I/F 11 starts to output the baseband signal in response to the detection of the termination unit 71.

The baseband signal output from the output I/F 11 is supplied to the transmitter 51 via the termination detecting unit 12 and the termination unit 71. The transmitter 51 converts the baseband signal from the output I/F 11 into the modulated signal and transmits the converted signal.

Figure 14:
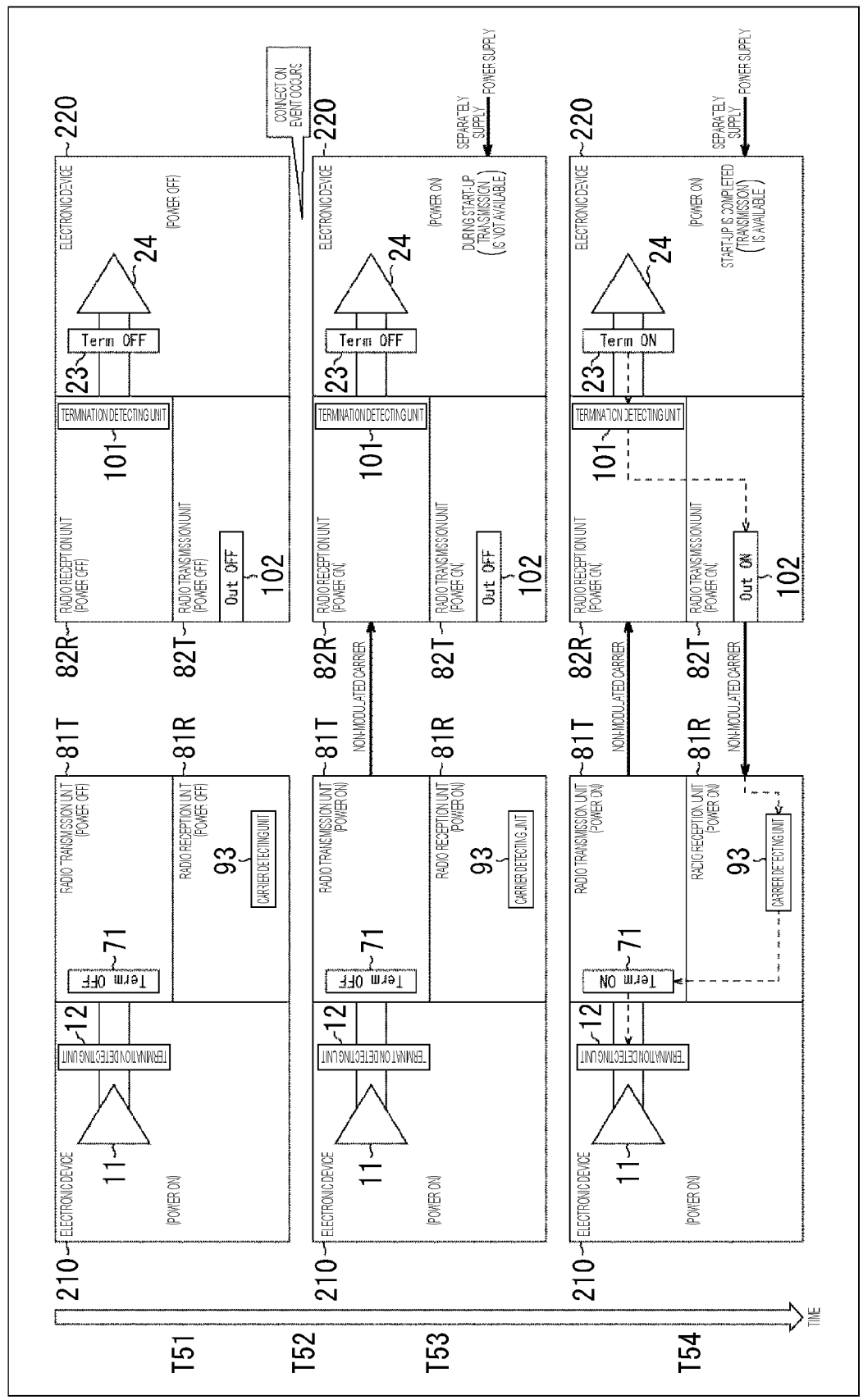
FIG. 14 is a diagram of an exemplary operation of the communication system.

FIG. 14 is a diagram of an exemplary operation of the communication system in FIG. 12.

Here, in FIG. 14, the transmitter 51 and the receiver 52, the transmitter 53 and the receiver 54 are omitted.

At a time T51, the electronic device 210 operates by receiving power supply from the external power supply or the built-in battery.

Furthermore, at the time T51, the electronic device 220 is turned off.

Therefore, at the time T51, the electronic device 220 is not yet in the state of performing a normal operation, and the termination unit 23 of the electronic device 220 is turned off (Term OFF).

Furthermore, at the time T51, that is, before the connection event occurs, the radio transmission unit 81T and the radio reception unit 81R of the radio connector 81 and the radio transmission unit 82T and the radio reception unit 82R of the radio connector 82 are turned off.

Therefore, the termination unit 71 of the radio transmission unit 81T is turned off (Term OFF).

In addition, the output controller 102 of the radio transmission unit 82T is in the OFF state (Out OFF) in which the transmitter 53 does not output the modulated signal.

After the time T51, when the connection event occurs at a time T52, the state of the electronic device 220 changes from the OFF state to the ON state.

The electronic device 220 starts the starting sequence at a time T53 after the power has been turned on.

While the starting sequence is performed in the electronic device 220, the termination unit 23 is not yet turned on and remains in the OFF state (Term OFF).

Furthermore, when the electronic device 220 is turned on by the occurrence of the connection event, the radio transmission unit 82T and the radio reception unit 82R of the radio connector 82 attached to the electronic device 220 are turned on.

With this operation, the termination detecting unit 101 of the radio reception unit 82R can detect the termination unit 23 of the electronic device 220.

However, at the time T53, since the termination unit 23 remains in the OFF state as described above, the termination unit 23 is not detected.

On the other hand, at the time T53, the states of the radio transmission unit 81T and the radio reception unit 81R of the radio connector 81 attached to the electronic device 210 change from the OFF state to the ON state in response to the occurrence of the connection event.

The radio transmission unit 81T is turned on so that the transmitter 51 starts to transmit (carrier of) the modulated signal (non-modulated carrier).

Subsequently, at the time T54, when the starting sequence of the electronic device 220 is completed and the electronic device 220 performs the normal operation, the state of the termination unit 23 changes from the OFF state to the ON state (Term ON).

The termination unit 23 which has been turned on is detected by the termination detecting unit 101 of the radio reception unit 82R.

The output controller 102 of the radio transmission unit 82T is in the ON state (Out ON) in which the transmitter 53 outputs the modulated signal in response to the detection of the termination unit 23 by the termination detecting unit 101. As a result, a modulated signal (non-modulated signal) (non-modulated carrier) is transmitted from the transmitter 53.

In the electronic device 210, the modulated signal transmitted from (transmitter 53 of) the radio transmission unit 82T is detected by the carrier detecting unit 93 of the radio reception unit 81R.

The state of the termination unit 71 of the radio transmission unit 81R changes from the OFF state to the ON state (Term ON) in response to the detection of the modulated signal (carrier) by the carrier detecting unit 103.

When the termination unit 71 is turned on, the termination detecting unit 12 of the electronic device 210 detects the termination unit 71 which has been turned on. In response to the detection of the termination unit 71 by the termination detecting unit 12, the output I/F 11 starts to output the baseband signal.

The baseband signal output from the output I/F 11 is supplied to the radio transmission unit 81T, and converted into the modulated signal and transmitted.

At the timing at which the modulated signal of the baseband signal output from the output I/F 11 is transmitted, in the radio transmission unit 81T of the electronic device 210, the starting sequence of the electronic device 220 is completed, and the electronic device 220 is in the state where the electronic device 220 can perform the normal operation.

Therefore, the electronic device 220 can receive the baseband signal from the electronic device 210, which is transmitted as the modulated signal.

As described above, in a case where the baseband signal is transmitted from the electronic device 210 to the electronic device 220 in one direction, the radio transmission unit 82T is made to transmit the (carrier of) modulated signal in response to the detection of the termination unit 23 which is turned on after the completion of the starting sequence in the electronic device 220, and the termination unit 71 is turned on in response to the detection of the modulated signal from the electronic device 220 in the electronic device 210. Accordingly, after completing the starting sequence and being in the state of performing the normal operation, the electronic device 220 can start to transmit the (modulated signal of) baseband signal from the electronic device 210. As a result, the electronic device 220 can normally receive the baseband signal from the electronic device 210.

Here, a system means herein an assembly of a plurality of components (devices, modules (parts), and the like), and it is not considered whether all the components are provided in the same housing. Therefore, both of a plurality of devices respectively housed in different housings from each other and connected via the network and a single device having a plurality of modules housed in one housing are systems.

Furthermore, the embodiment of the present technology is not limited to the above-mentioned embodiments, and various changes can be made without departing from the scope of the present technology.

For example, it is possible to connect between the radio connectors 81 and 82 with a cable made of a dielectric to be a transmission path of the modulated signal in the millimeter wave band.

Furthermore, regarding the radio connectors 81 and 82, it is possible to employ the radio connector 81 as one of connectors at both ends of one USB cable and employ the radio connector 82 as one of connectors at both ends of the other USB cable.

In this case, the other connector of the one USB cable is attached to the USB host 10 and the other connector of the other USB cable is attached to the USB device 20, and the radio connector 81 of the one USB cable is connected to or brought into contact with the radio connector 82 of the other USB cable. As a result, the baseband signal is transmitted between the USB host 10 and the USB device 20 by the modulated signal in the millimeter wave band.

Furthermore, in the present embodiment, the millimeter wave band signal is employed as the modulated signal. However, a signal of a frequency band lower than or higher than the millimeter wave can be employed as the modulated signal.

Furthermore, in the present embodiment, a case where the present technology is applied to an electronic device (communication system including electronic devices) compliant with the USB standard has been described. However, in addition to electronic devices compliant with the USB devices, the present technology can be applied to an electronic device which employs a system for detecting a communication partner (connection to communication partner) by using a mechanism to be detected included in the communication partner, such as an electronic device having the PCI Express as an interface.

Furthermore, the effects described herein are only exemplary and not limited to these. Also, there may be an additional effect.

Furthermore, the present technology can have the following configurations.

<1>

A communication device including:

a transmission unit configured to transmit a modulated signal obtained by frequency-converting a baseband signal into a signal having a higher frequency band than the baseband signal by using a predetermined carrier;

a detecting unit configured to detect a termination unit of a second electronic device having the termination unit detected by a first electronic device to be a communication partner; and a controller configured to make the transmission unit transmit the carrier in response to the detection of the termination unit.

<2>

The communication device according to <1>, further including:

a reception unit configured to receive a modulated signal to be transmitted from a side of the first electronic device and supply the received signal to the second electronic device.

<3>

The communication device according to <1> or <2>, in which the second electronic device starts to output the baseband signal in response to the detection of the termination unit,
the communication device further includes:
a carrier detecting unit configured to detect a carrier to be transmitted from a side of the first electronic device; and
a corresponding mechanism, which is turned on in response to the detection of the termination unit and the detection of the carrier and detected by the second electronic device, configured to correspond to the termination unit, and
the transmission unit transmits the modulated signal which is obtained by frequency-converting the baseband signal output by the second electronic device in response to the detection of the corresponding mechanism which is turned on.
<4>
The communication device according to any one of <1> to <3>
the modulated signal is a signal in a millimeter wave band.
<5>
The communication device according to any one of <1> to <4>, which is configured as a connector attached to the second electronic device.
<6>
The communication device according to any one of <1> to <5>, in which
one of the first and second electronic devices is a universal serial bus (USB) host, and the other one is a USB device.
<7>
The communication device according to any one of <1> to <6>, in which
the transmission unit transmits the modulated signal by using a waveguide as a transmission path.
<8>
A control method including:
detecting a termination unit of a second electronic device by a detecting unit of a communication device; and
transmitting a carrier to a transmission unit in response to the detection of the termination unit by a controller, the communication device including:
the transmission unit which transmits a modulated signal obtained by frequency-converting a baseband signal into a signal having a higher frequency band than the baseband signal by using a predetermined carrier;
the detecting unit which detects the termination unit of the second electronic device having the termination unit detected by a first electronic device to be a communication partner; and
the controller which makes the transmission unit transmit the carrier.

REFERENCE SIGNS LIST 10 electronic device (USB host)
11 output I/F
12 termination detecting unit
13 termination unit
14 input I/F
20 electronic device (USB device)
21 output I/F
22 termination detecting unit
23 termination unit
24 input I/F
30 cable (USB cable)
31, 32 connector
33 cable
41, 42 radio connector
41T, 42T radio transmission unit
41R, 42R radio reception unit
51 transmitter
51A oscillator
51B mixer
51C amplifier
52 receiver
52A amplifier
52B mixer
53 transmitter
53A oscillator
53B mixer
53C amplifier
54 receiver
54A amplifier
54B mixer
61, 62 radio connector
61T, 62T radio transmission unit
61R, 62R radio reception unit
71, 72 termination unit
81, 82 radio connector
81T, 82T radio transmission unit
81R, 82R radio reception unit
91 termination detecting unit
92 output controller
93 carrier detecting unit
101 termination detecting unit
102 output controller
103 carrier detecting unit
210, 220 electronic device

What is claimed is:

1. A communication device comprising:
a detecting unit configured to detect a second termination unit of a second electronic device to be a communication partner, wherein the detecting unit is connected to a first termination unit in the communication device corresponding to the second termination unit of the second electronic device, wherein one of the communication device or the second electronic device is a universal serial bus (USB) host, and the other one is a USB device;
a transmission unit configured to transmit a modulated signal obtained by frequency-converting a baseband signal into a signal having a higher frequency band than the baseband signal by using a predetermined carrier;
the detecting unit configured to detect the second termination unit of the second electronic device is turned on by detecting the first termination unit of the communication device is turned on; and
a controller configured to make the transmission unit transmit the modulated signal in response to the detection that the second termination unit of the second electronic device is on, wherein the transmission unit transmits the modulated signal by using a waveguide as a transmission path.

2. The communication device according to claim 1, wherein the modulated signal is a signal in a millimeter wave band.

3. A control method comprising:
detecting a second termination unit of a second electronic device by a detecting unit of a communication device, wherein the detecting unit is connected to a first termination unit in the communication device and the first termination unit corresponds to the second termination unit in the second electronic device, and wherein one of the communication device or the second electronic device is a universal serial bus (USB) host, and the other one is a USB device; and transmitting by a transmission unit upon command from a controller, a modulated signal obtained by frequency-converting a baseband signal into a signal having a higher frequency band than the baseband signal by using a predetermined carrier in response to detecting the second termination unit is on by detecting the first termination unit of the communication device is turned on, wherein the transmission unit transmits the modulated signal by using a waveguide as a transmission path.

4. The control method according to claim 3, wherein the modulated signal is a signal in a millimeter wave band.

* * * * *